US012627710B2

(12) United States Patent
He et al.

(10) Patent No.: US 12,627,710 B2
(45) Date of Patent: *May 12, 2026

(54) NETWORK SECURITY PROTECTION METHOD AND PROTECTION DEVICE

(71) Applicant: HUAWEI TECHNOLOGIES CO., LTD., Shenzhen (CN)

(72) Inventors: Xinqian He, Hangzhou (CN); Kan Zhou, Vancouver (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

This patent is subject to a terminal disclaimer.

(21) Appl. No.: 18/314,670

(22) Filed: May 9, 2023

(65) Prior Publication Data

US 2023/0275924 A1     Aug. 31, 2023

Related U.S. Application Data

(63) Continuation of application No. PCT/CN2021/088488, filed on Apr. 20, 2021.

(30) Foreign Application Priority Data

Nov. 10, 2020     (CN) .......................... 202011248794.5

(51) Int. Cl.
*H04L 9/40* (2022.01)

(52) U.S. Cl.
CPC .......... *H04L 63/166* (2013.01); *H04L 63/145* (2013.01); *H04L 63/20* (2013.01)

(58) Field of Classification Search
CPC ............. H04L 63/0209; H04L 63/0281; H04L 63/0428; H04L 63/12; H04L 63/1416;
(Continued)

(56) References Cited

U.S. PATENT DOCUMENTS

2002/0141448 A1     10/2002     Matsunaga
2011/0320617 A1 *     12/2011     Annamalaisami .... H04L 63/166
709/228
(Continued)

FOREIGN PATENT DOCUMENTS

CN          106375330 A          2/2017
CN          106685930 A          5/2017
(Continued)

OTHER PUBLICATIONS

Chen, "TCP (Part 1)," Cool Shell, https://coolshell.cn/articles/11564. html, Total 23 pages (May 28, 2014).

*Primary Examiner* — Gil H. Lee
(74) *Attorney, Agent, or Firm* — Leydig, Voit & Mayer, Ltd.

(57)          ABSTRACT

This application provides a network security protection method and a protection device, and pertains to the field of communication technologies. When a client and a server exchange a packet in a first session, a protection device identifies an application layer protocol type based on application layer data in the packet in the first session, and if determining, based on the application layer protocol type, that a detection mode is a proxy mode, the protection device performs security detection on a subsequent packet in the first TCP session in the proxy mode. This breaks a technical bottleneck that the packet in the first TCP session can be detected in only a flow mode, ensures that the packet in the first TCP session can also be detected in the proxy mode, and avoids missing attack detection caused because the packet in the first TCP session is limited to the flow mode.

16 Claims, 9 Drawing Sheets

(58) Field of Classification Search
CPC ............... H04L 63/1425; H04L 63/145; H04L
63/1466; H04L 63/166; H04L 63/20
See application file for complete search history.

(56) References Cited

U.S. PATENT DOCUMENTS

| | | |
|---|---|---|
| 2014/0189837 A1 | 7/2014 | Maurer |
| 2014/0283000 A1* | 9/2014 | Radhakrishnan ... H04L 63/1408 726/12 |
| 2017/0371694 A1 | 12/2017 | Kim |
| 2018/0234388 A1* | 8/2018 | Reddy ................... H04L 63/061 |
| 2019/0245930 A1* | 8/2019 | Rahkonen ............... H04L 67/34 |
| 2021/0351980 A1 | 11/2021 | Huffman et al. |

FOREIGN PATENT DOCUMENTS

| | | |
|---|---|---|
| EP | 2963887 A1 | 1/2016 |
| JP | 2015528263 A | 9/2015 |

* cited by examiner

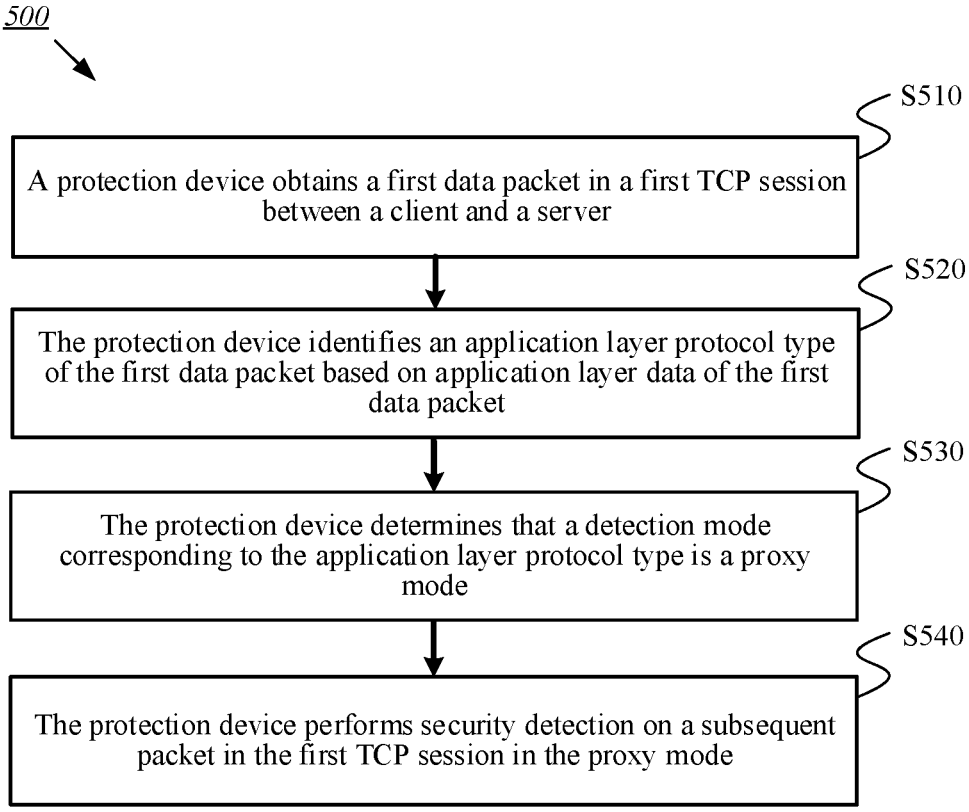

_500_

S510

A protection device obtains a first data packet in a first TCP session between a client and a server

S520

The protection device identifies an application layer protocol type of the first data packet based on application layer data of the first data packet

S530

The protection device determines that a detection mode corresponding to the application layer protocol type is a proxy mode

S540

The protection device performs security detection on a subsequent packet in the first TCP session in the proxy mode

Protection device

130

Upper-layer
service module

TCP control layer

1331

TCP/IP protocol stack module/
proxy mode processing

13111

Received
packet
queue

13112

Sent
packet
queue

1332

TCP/IP protocol stack module/
proxy mode processing

13321

Received
packet
queue

13322

Sent
packet
queue

Data
packet

Acknowledgement
packet

Acknowledgement
packet

Data
packet

11

Client device

12

Server

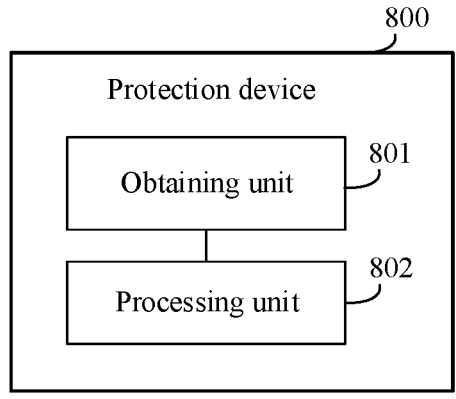

Protection device

Obtaining unit 801

Processing unit 802

FIG. 10

NETWORK SECURITY PROTECTION METHOD AND PROTECTION DEVICE

CROSS-REFERENCE TO RELATED APPLICATIONS

This application is a continuation of International Application No. PCT/CN2021/088488, filed on Apr. 20, 2021, which claims priority to Chinese Patent Application No. 202011248794.5, filed on Nov. 10, 2020. The disclosures of the aforementioned applications are hereby incorporated by reference in their entireties.

TECHNICAL FIELD

This application relates to the field of communication technologies, and in particular, to a network security protection method and a protection device.

BACKGROUND

A basic principle of an existing network security protection solution is that a protection device (such as a firewall) is deployed between a client and a protected server, and the protection device detects a packet exchanged between the client and the server.

A proxy mode is an important detection mode of the protection device. A principle of the proxy mode is that the protection device instead of a server sends an acknowledgement packet to a client, and the protection device instead of the client sends an acknowledgement packet to the server. In the proxy mode, the protection device needs to use a transmission control protocol/internet protocol (TCP/IP) protocol stack to reliably send a packet. The proxy mode helps detect a complex network attack and can better meet a security protection requirement. However, in the proxy mode, the protection device needs to buffer and reassemble a large quantity of data packets and support a complete protocol stack. Therefore, a large quantity of resources are consumed.

In a related technology, when there are a large quantity of clients and servers, due to a limitation of processing performance, it is difficult for a protection device to detect, in the proxy mode, packets exchanged in all sessions between each client and each server. A common practice is that the protection device performs identification in a process in which the first session is established between the client and the server, and records information such as an IP address, a destination port number, and a protocol type of the first session, to determine whether it is necessary to perform, in the proxy mode, detection on a subsequent session established between the same client and the same server through a same port. In this solution, the protection device actually does not perform security detection on a packet in the first session established between the client and the server. In this solution, if attack behavior exists in the packet exchanged between the client and the server in the first session, the protection device has a problem of missing detection.

SUMMARY

Embodiments of this application provide a network security protection method and a protection device, to help avoid missing detection when attack behavior exists in a packet in the first session. The technical solutions are as follows.

According to a first aspect, a network security protection method is provided. In the method, a protection device obtains a first data packet in a first TCP session between a client device and a server, where the first TCP session is the $1^{st}$ session established between the client device and the server, and the protection device is deployed between the client device and the server; the protection device identifies an application layer protocol type of the first data packet based on application layer data of the first data packet; the protection device determines that a detection mode corresponding to the application layer protocol type is a proxy mode; and the protection device performs security detection on a subsequent packet in the first TCP session in the proxy mode.

The first aspect provides a solution for quickly switching to the proxy mode. When the client and the server exchange a packet in the first session, the protection device identifies an application layer protocol type based on application layer data in the packet in the first session, and if determining, based on the application layer protocol type, that a detection mode is the proxy mode, the protection device performs security detection on a subsequent packet in the first TCP session in the proxy mode. This breaks a technical bottleneck that the packet in the first TCP session can be detected in only a flow mode, ensures that the packet in the first TCP session can also be detected in the proxy mode, and avoids missing attack detection caused because the packet in the first TCP session is limited to the flow mode.

Optionally, before the protection device obtains the first data packet in the first TCP session between the client device and the server, the method further includes: The protection device obtains a first handshake packet transmitted between the client device and the server, where the first handshake packet is used to create the first TCP session, the first handshake packet includes a first option and a second option, the first option is an option supported by the protection device, and the second option is an option not supported by the protection device; the protection device deletes the second option from the first handshake packet, to obtain a second handshake packet; and the protection device sends the second handshake packet to a destination device of the first handshake packet.

In the foregoing optional manner, a packet transmission failure caused when it is difficult for the protection device to parse an option used by the client or the server after the protection device switches to the proxy mode for the first flow because the client device and the server device perform communication by using the option not supported by the protection device is avoided, thereby improving reliability and a success rate in the mode switching procedure.

Optionally, the subsequent packet in the first TCP session includes a second data packet, and that the protection device performs security detection on a subsequent packet in the first TCP session in the proxy mode includes: The protection device receives and buffers the second data packet; the protection device generates an acknowledgment packet for the second data packet based on the first option; and the protection device sends the acknowledgement packet for the second data packet to a source device of the second data packet, where the source device of the second data packet is the client device or the server.

In the foregoing optional manner, an implementation about how to switch a mode in a complex case in which a data packet has been buffered in the flow mode is provided, thereby improving availability of the solution.

Optionally, the subsequent packet in the first TCP session includes a third data packet, and that the protection device performs security detection on a subsequent packet in the first TCP session in the proxy mode includes: The protection device sends and buffers the third data packet; and if the third data packet meets a retransmission condition, the protection device resends the third data packet to a destination device of the third data packet based on the first option, where the destination device of the third data packet is the client device or the server.

In the foregoing optional manner, an implementation about how to switch a mode in a complex case in which a data packet has been sent in the flow mode is provided, thereby improving availability of the solution.

Optionally, the retransmission condition includes: the protection device does not receive an acknowledgement packet for a data packet; or the first option is a selective acknowledgement (selective acknowledgement, SACK) option, and the retransmission condition includes: the protection device determines, based on information in a SACK option from a destination device of a data packet, that a packet loss occurs in the data packet.

The foregoing optional manner helps the protection device ensure packet transmission reliability in the proxy mode.

Optionally, the first handshake packet is a synchronize sequence number (SYN) packet from the client device, and the destination device of the first handshake packet is the server; or the first handshake packet is a synchronize sequence number acknowledgement (SYN ACK) packet from the server, and the destination device of the first handshake packet is the client device.

Optionally, the security detection is anti-virus (AV) detection, and that the protection device performs security detection on a subsequent packet in the first TCP session in the proxy mode includes: The protection device performs AV detection on a fourth data packet in the first TCP session in the proxy mode, where the fourth data packet is a packet transmitted after the first data packet in the first TCP session. The method further includes: If a result of the AV detection performed by the protection device on the fourth data packet in the first TCP session is that there is no virus, the protection device switches to a flow mode, and continues to perform, in the flow mode, security detection on a subsequent packet transmitted after the fourth data packet in the first TCP session.

In the foregoing optional manner, when finding, based on the AV detection result, that a data packet exchanged between the client device and the server in the first session does not include a virus, the protection device switches from the proxy mode to the flow mode, to accelerate a subsequent processing procedure in the first session in the flow mode, reduce resource occupation of the device, and help improve detection performance.

Optionally, that the protection device performs security detection on a subsequent packet in the first TCP session in the proxy mode includes: The protection device detects a fifth data packet in the first TCP session in the proxy mode, where the fifth data packet is a packet transmitted after the first data packet in the first TCP session. The method further includes: If application layer data of the fifth data packet indicates that the client device and the server are to perform encrypted communication in the TCP session, the protection device switches to a flow mode, and continues to perform, in the flow mode, security detection on a subsequent packet transmitted after the fifth data packet in the first TCP session.

In the foregoing optional manner, the protection device switches from the proxy mode to the flow mode when finding that the client device and the server are to perform encrypted communication in the first session subsequently. This helps switch back to the flow mode in a timely manner in a scenario in which the protection device cannot detect encrypted data in the proxy mode because the protection device does not support an encryption/decryption function, thereby accelerating a subsequent processing procedure in the first session in the flow mode, reducing resource occupation of the device, and improving detection performance.

According to a second aspect, a protection device is provided. The protection device has a function of implementing any one of the first aspect or the optional manners of the first aspect. The protection device includes at least one unit, and the at least one unit is configured to implement the method provided in any one of the first aspect or the optional manners of the first aspect.

In some embodiments, the unit in the protection device is implemented by using software, and the unit in the protection device is a program module. In some other embodiments, the unit in the protection device is implemented by using hardware or firmware. For specific details of the protection device provided in the second aspect, refer to any one of the first aspect or the optional manners of the first aspect. Details are not described herein again.

According to a third aspect, a protection device is provided. The protection device includes a processor and a communication interface. The processor is configured to execute instructions, so that the protection device performs the method provided in any one of the first aspect or the optional manners of the first aspect. The communication interface is configured to receive or send a packet. For specific details of the protection device provided in the third aspect, refer to any one of the first aspect or the optional manners of the first aspect. Details are not described herein again.

According to a fourth aspect, a computer-readable storage medium is provided. The storage medium stores at least one instruction, and the instruction is read by a processor, so that a protection device performs the method provided in any one of the first aspect or the optional manners of the first aspect.

According to a fifth aspect, a computer program product is provided. The computer program product includes one or more computer instructions, and when the computer program instructions are loaded and executed by a computer, the computer is enabled to perform the method provided in any one of the first aspect or the optional manners of the first aspect.

According to a sixth aspect, a chip is provided. When the chip runs on a protection device, the protection device is enabled to perform the method provided in any one of the first aspect or the optional manners of the first aspect.

According to a seventh aspect, a network system is provided. The network system includes a protection device, a client device, and a server, and the protection device is configured to perform the method according to any one of the first aspect or the optional manners of the first aspect.

BRIEF DESCRIPTION OF DRAWINGS

FIG. 5 is a flowchart of a network security protection method according to an embodiment of this application;

FIG. 9 is a diagram of a system architecture of a protection device according to an embodiment of this application; and FIG. 10 is a schematic diagram of a structure of a protection device according to an embodiment of this application.

DESCRIPTION OF EMBODIMENTS

To make the objectives, technical solutions, and advantages of this application clearer, the following further describes implementations of this application in detail with reference to the accompanying drawings.

An earliest firewall is implemented by adding an access control list (ACL) based on a conventional router to filter a forwarded data packet, and is referred to as a packet filtering firewall. A basic principle of packet filtering is as follows: A firewall first obtains packet header information of a data packet to be forwarded. The packet header information is network layer information such as an internet protocol (IP) address, a source port, and a destination port. Then, the firewall compares the packet header information with a specified rule (an entry in an ACL), and the firewall forwards or discards the data packet based on a comparison result.

Figure 1:
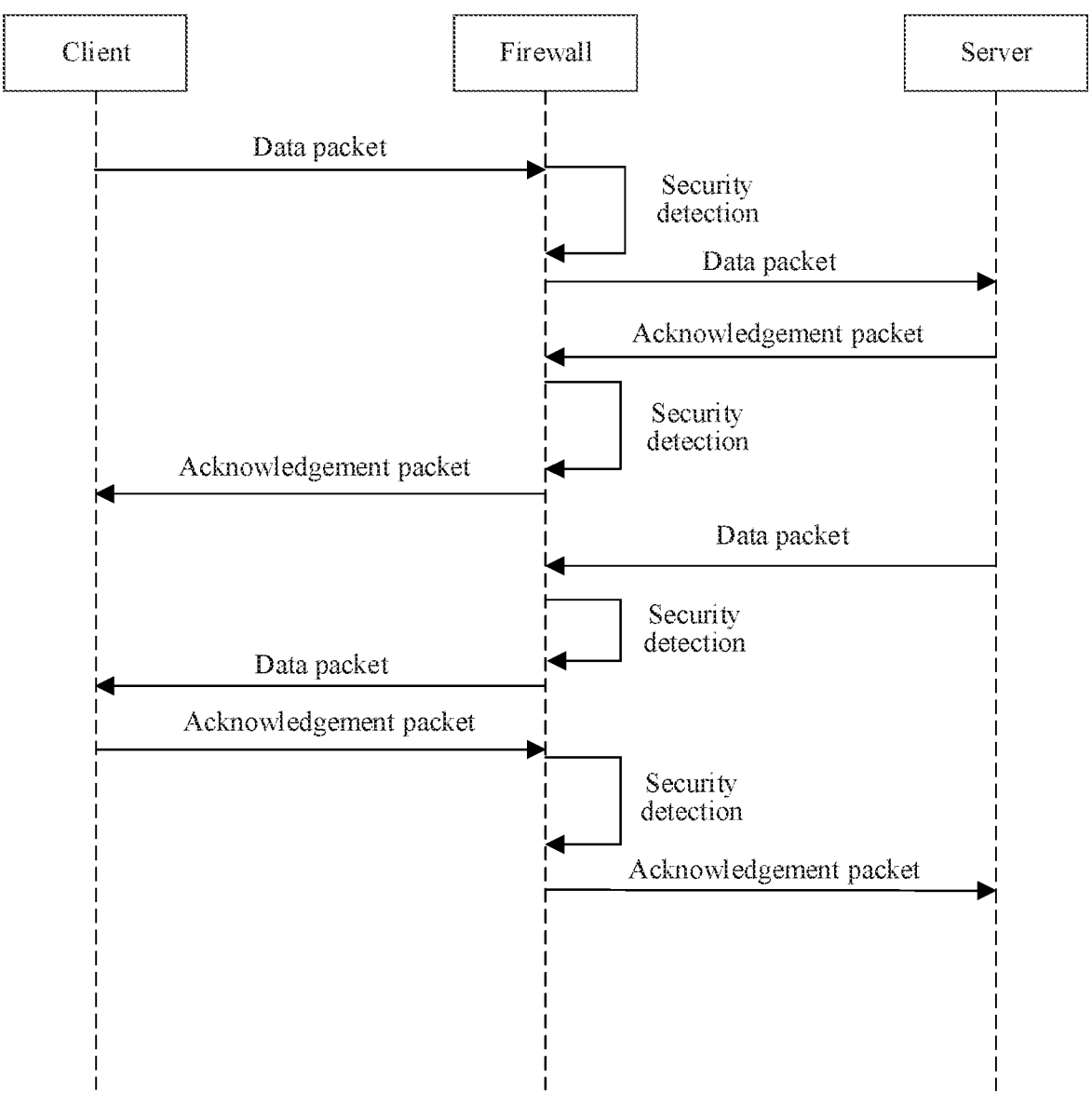
FIG. 1 is a flowchart of packet exchange in a flow mode according to an embodiment of this application.

A flow mode further involves session state information based on the foregoing packet filtering mode. FIG. 1 shows a process of packet exchange in the flow mode. In the flow mode, a firewall performs packet filtering matching on original packets sent by a client and a server, and determines whether to discard the packets or forward the packets. In the flow mode, although the firewall maintains session state information, the firewall seldom modifies a packet, and seldom actively generates a packet and sends the packet to the client and the server. Reliability of packet transmission depends on transmission control protocol (TCP)/IP protocol stacks deployed on the client and the server. For example, after a data packet sent by the client is detected by the firewall, if the data packet is lost unexpectedly when being sent to the server, based on a TCP retransmission mechanism on the client, the client is responsible for resending the lost packet.

With the increasing complexity of networks and applications, a simple packet filtering technology for network layer information detection cannot meet a security protection requirement. An AV detection scenario is used as an example. An anti-virus function requires that a complete transmitted file needs to be obtained to detect some advanced viruses. However, a TCP transmission mechanism requires that after the client sends specific data (a part of files), the server needs to respond, and the client continues to send subsequent data only after receiving a response. However, the server responds only after the server receives data from the client. Therefore, when the firewall uses the flow mode, a data packet can only be sent. The client sends a subsequent data packet only after the server receives the data packet from the firewall and responds. The firewall can start to perform virus detection on an extracted file (buffered and copied by the firewall) only after the data packet is sent. In this case, even if the firewall discovers a virus, the firewall cannot block the virus. This is because almost all data packets have been sent to the server, an actually effective part of the virus has been sent, and an attack has formed. It is clear that protection effect for the server is poor. To block a virus, some studies introduce a proxy mode (proxy mode).

Figure 2:
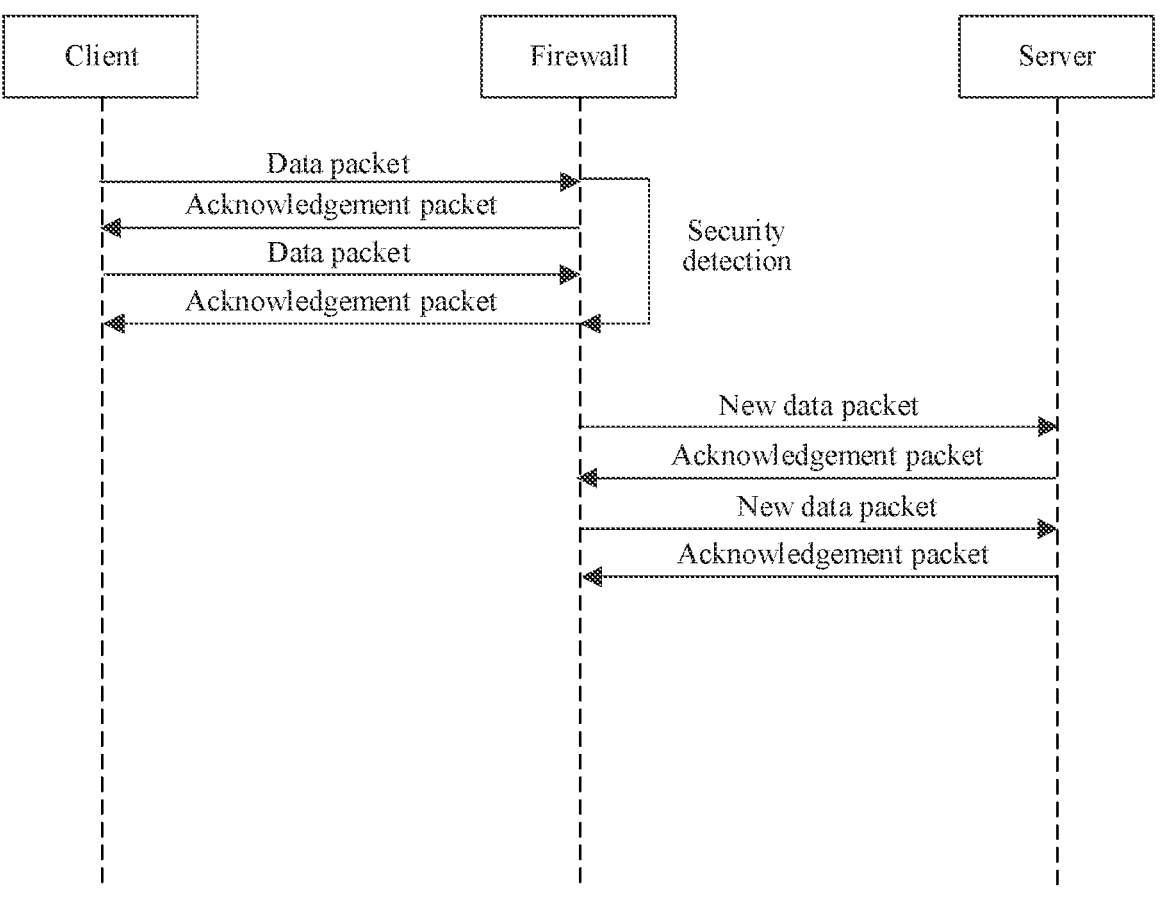
FIG. 2 is a flowchart of packet exchange in a proxy mode according to an embodiment of this application.

FIG. 2 shows a process of packet exchange in the proxy mode. In the proxy mode, a firewall serves as a simulated server, and the firewall instead of a server interacts with a client. In addition, the firewall serves as a simulated client, and the firewall instead of the client interacts with the server. For example, in a virus detection scenario, the firewall instead of the server sends an acknowledgement (ACK) packet to the client, so that the client continues to send a subsequent data packet under triggering of the acknowledgement packet. In a process in which the firewall and the client exchange data packets, the data packets are not sent to the server. After the firewall obtains all data packets from the client and then obtains complete file content, the firewall starts virus detection. If the firewall discovers a virus, the firewall deletes an entire file containing the virus, to ensure that the virus is not sent to the server. Alternatively, the firewall does not delete an attachment but notifies a user of existence of the virus in the attachment by adding prompt information. For a file in which no virus is discovered, the firewall instead of the client sends the file to the server.

It can be learned from the principle of the proxy mode that, in the proxy mode, the firewall actively returns an acknowledgement packet to a source end (for example, the client) of a data packet, so that the source end continues to send a subsequent data packet under triggering of the acknowledgement packet. Therefore, the firewall can receive more data packets, thereby obtaining more data for detection. It is clear that the proxy mode helps detect a complex network attack and improve accuracy of security detection. In addition, in the proxy mode, the firewall detects complete content of a file, and forwards the file to a destination end (for example, the server) of the data packet only after determining that the file is secure. This avoids a case in which although it is detected that a file contains a virus, but the file containing the virus has been forwarded to a destination end. It is clear that virus spread can be better blocked, and effectiveness of security protection can be improved.

In the proxy mode, the protection device needs to buffer and reassemble a large quantity of data packets and support a complete protocol stack. Therefore, a large quantity of resources are consumed. Due to a hardware resource limitation, performance, and the like, it is difficult for the firewall to process all sessions in the proxy mode by default. Considering complexity of traffic on a live network (non-standard port) and flexibility of user configuration (application layer-based configuration) in an actual application scenario, the firewall cannot determine, based on an SYN packet in the first session, whether to use the proxy mode, and only after performing specific data packet exchange, the firewall can determine whether to use the proxy mode for processing. Therefore, the protection device such as the firewall performs protocol identification on a packet in the first session in the flow mode, and determines, based on an identification result, whether to use the proxy mode. If the proxy mode needs to be used for detection, the server records an IP address, a port number, and the like of the server based on an SYN packet, to form an identification table. When the client subsequently attempts to reestablish a session with the same port number of the server, if the IP address and the port number of the server exist in the identification table, the protection device detects a packet in a subsequently established session in the proxy mode.

In a study process, it is found that the foregoing solution has many defects. A flow in the first session (for example, the first flow transmitted from the server to the client and the first flow transmitted from the client to the server) is not processed in the proxy mode. Therefore, for a complex service that depends on the proxy mode for detection, for example, a characteristic such as security socket layer (SSL) decryption, if the flow in the first session (for example, the first flow transmitted from the server to the client and the first flow transmitted from the client to the server) contains attack behavior, the firewall cannot detect the attack behavior. As a result, the attack fails to be detected, and network security is severely affected.

In view of this, embodiments of this application provide a solution for quickly switching to the proxy mode. By implementing this technical solution, the firewall or another protection device can detect the first flow in the proxy mode according to a requirement of an application layer for security detection. This breaks a technical bottleneck that the first flow can be detected in only the flow mode, and avoids missing attack detection caused because the first flow is limited to the flow mode.

Compared with the solution in which the flow mode is used for the first flow by default, this technical solution can ensure that full security detection is performed on all traffic, even the first flow of a non-standard port, and no threat is missed, thereby fully improving security protection effect. Compared with the solution in which the proxy mode is used by default, this technical solution greatly reduces a quantity of proxy sessions, reduces resource consumption of a device, and improves an overall processing capability of the device.

The following describes the technical solution in detail from a plurality of perspectives such as a system running environment, a hardware apparatus, a software apparatus, and a method procedure.

Figure 3:
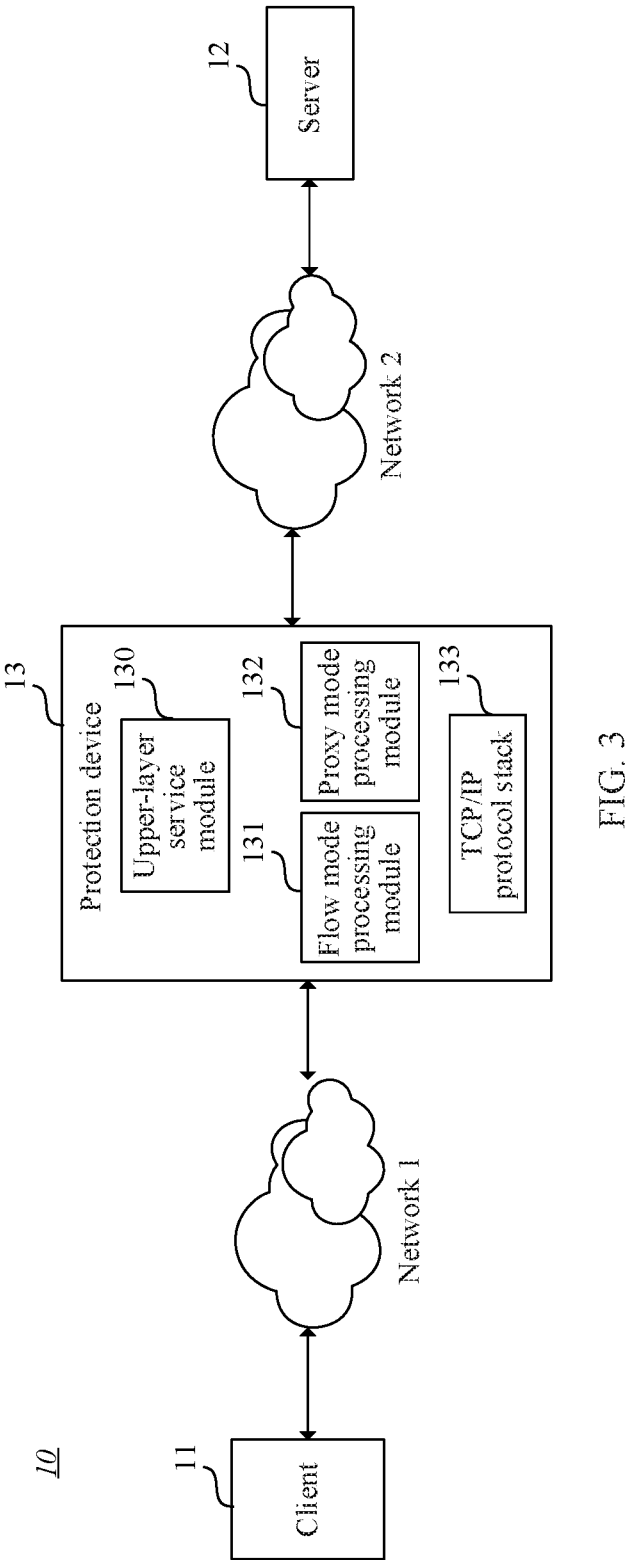
FIG. 3 is a schematic diagram of a typical application scenario according to an embodiment of this application.

With reference to FIG. 3, the following describes a system running environment provided in an embodiment of this application.

FIG. 3 is a schematic diagram of a typical application scenario 10 according to an embodiment of this application. The application scenario 10 includes a client device 11, a server 12, and a protection device 13. The following separately describes the client device 11, the server 12, and the protection device 13.

(1) Client Device 11

The client device 11 is a device that initiates access in a TCP session. The client device 11 includes but is not limited to a personal computer, a mobile phone, the server 12, a notebook computer, an IP phone, a camera, a tablet computer, a wearable device, or the like. For example, the client device 11 is an office device of an employee in an enterprise.

In some embodiments, an application such as a mailbox client or a file transfer client is installed on the client device 11. The client device 11 generates application layer data by using the application, and exchanges the application layer data with the server 12 based on an application layer protocol, to trigger the following method embodiment. In an example scenario, in a process of running the mailbox client, the client device 11 transmits a mail to the server 12 based on SMTP. In another example scenario, in a process of running the file transfer client, the client device 11 transmits a file to the server 12 based on the file transfer protocol (file transfer protocol, FTP).

In some embodiments, the system architecture 10 includes a large quantity of client devices 11. For brevity, one client device 11 is used as an example for description in FIG. 3.

(2) Server 12

The server 12 is a device that provides a service in a TCP session. For example, the server 12 is a mail server 12, and the mail server 12 provides a mail transfer service for a client based on SMTP. For another example, the server 12 is a file server 12, and the file server 12 provides a file transfer service for a client based on FTP. For another example, the server 12 is a website server.

File transfer between the client device 11 and the server 12 may be bidirectional, that is, the client device 11 may send a file to the server 12, and the server 12 may send a file to the client device 11.

(3) Protection Device 13

The protection device 13 is deployed between the client device 11 and the server 12. The protection device 13 is separately connected to the client device 11 and the server 12 over a network. The protection device 13 is configured to perform security detection on a packet transmitted in the network. The security detection includes but is not limited to IPS detection, AV detection, or the like. The protection device 13 includes but is not limited to a firewall, an intrusion detection system (IDS) device, or an IPS device. The protection device 13 is, for example, a network detection device deployed in an in-line mode in the network.

A plurality of detection modes supported by the protection device 13 form a detection mode set. The detection mode set includes at least one detection mode. For example, the detection mode set includes a packet filtering mode, a flow mode, a proxy mode, or the like.

The following describes an internal logical function architecture of the protection device 13 by using an example in which the set of detection modes supported by the protection device 13 includes the flow mode and the proxy mode.

As shown in FIG. 3, the protection device 13 includes an upper-layer service module 130, a flow mode processing module 131, a proxy mode processing module 132, and a TCP/IP protocol stack module 133.

(a) Upper-Layer Service Module 130

The upper-layer service module 130 is implemented, for example, by using an application on the protection device 13. The upper-layer service module 130 is configured to process a service at an application layer. In some embodiments of this application, the upper-layer service module 130 is configured to perform protocol identification based on application layer data, to determine, based on an identified protocol type, a specific detection mode to be used to detect a packet.

(b) Flow Mode Processing Module 131

The flow mode processing module 131 is responsible for a task of processing a packet in a TCP session in a flow mode. For example, the flow mode processing module 131 is configured to receive, in the flow mode, a data packet from the client device 11 or the server 12, buffer the received data packet, forward the data packet to the client device 11 or the server 12, receive an acknowledgement packet from the client device 11 or the server 12, and forward the acknowledgement packet to the client device 11 or the server 12. For specific composition of the flow mode processing module 131, refer to related descriptions in FIG. 8.

(c) Proxy Mode Processing Module 132

The proxy mode processing module 132 is responsible for a task of processing a packet in a TCP session in a proxy mode. In some embodiments, the proxy mode processing module 132 and the TCP/IP protocol stack module 133 are disposed separately. An example in which the proxy mode processing module 132 and the TCP/IP protocol stack module 133 are disposed separately is used for description in FIG. 3. In some other embodiments, the proxy mode processing module 132 and the TCP/IP protocol stack module 133 are integrated into a same module.

(d) TCP/IP Protocol Stack Module 133

The TCP/IP protocol stack module 133 is configured to transmit a packet based on TCP/IP, to ensure packet transmission reliability. For specific composition of the TCP/IP protocol stack module 133, refer to related descriptions in FIG. 8 or FIG. 9. In some embodiments, the TCP/IP protocol stack module 133 is implemented by using software. In some other embodiments, the TCP/IP protocol stack module 133 is implemented by using hardware, or implemented by using a combination of software and hardware. For example, the protection device 13 is configured with an accelerator. The accelerator is hardware dedicated to processing a step related to a TCP/IP protocol stack. The TCP/IP protocol stack module 133 is implemented by using the accelerator, to offload the TCP/IP protocol stack to the accelerator, thereby reducing load of a central processing unit (CPU).

The TCP/IP protocol stack module 133 ensures transmission reliability mainly by using an acknowledgement reply and a retransmission mechanism. Specifically, after the TCP/IP protocol stack module 133 receives a data packet, the TCP/IP protocol stack module 133 returns an acknowledgement packet to a source end of the data packet. After the TCP/IP protocol stack module 133 sends a data packet, if the data packet meets a retransmission condition, the TCP/IP protocol stack module 133 resends the data packet to a destination end of the data packet.

In some embodiments, the retransmission condition includes that an acknowledgement packet for the data packet is not received. For example, after the TCP/IP protocol stack module 133 sends a data packet to a peer end, if no acknowledgement packet corresponding to the data packet is received within preset duration, the retransmission condition is met, and the TCP/IP protocol stack module 133 automatically retransmits the data packet.

In some other embodiments, the retransmission condition includes determining, based on information in a selective acknowledgement (SACK) option in an acknowledgement packet sent by a peer end (the client device 11 or the server 12), that a packet loss occurs in the data packet. This retransmission condition is applicable to a case in which the TCP/IP protocol stack module 133 supports the SACK option. For example, after the TCP/IP protocol stack module 133 sends a data packet to the peer end, the TCP/IP protocol stack module 133 receives an acknowledgement packet from the peer end. If the TCP/IP protocol stack module 133 determines, based on a range in the SACK option in the acknowledgement packet and a recorded largest sequence number (Seq), that the data packet is lost, the TCP/IP protocol stack module 133 retransmits the data packet. For example, the protection device 13 sends four packets whose Seq numbers are respectively 1, 2, 3, and 4. The packet whose Seq number is 1 is lost for a network reason, and the three packets whose Seq numbers are 2, 3, and 4 are successfully transmitted to the peer end. When the peer end receives the three packets whose Seq numbers are 2, 3, and 4, the peer end notifies, by using the SACK option in the acknowledgement packet, the protection device 13 that the three packets whose Seq numbers are 2, 3, and 4 are received, and only the packet whose Seq number is 1 is not received. In this case, the packet whose Seq number is 1 meets the retransmission condition, and the protection device 13 retransmits the packet whose Seq number is 1.

Figure 4:
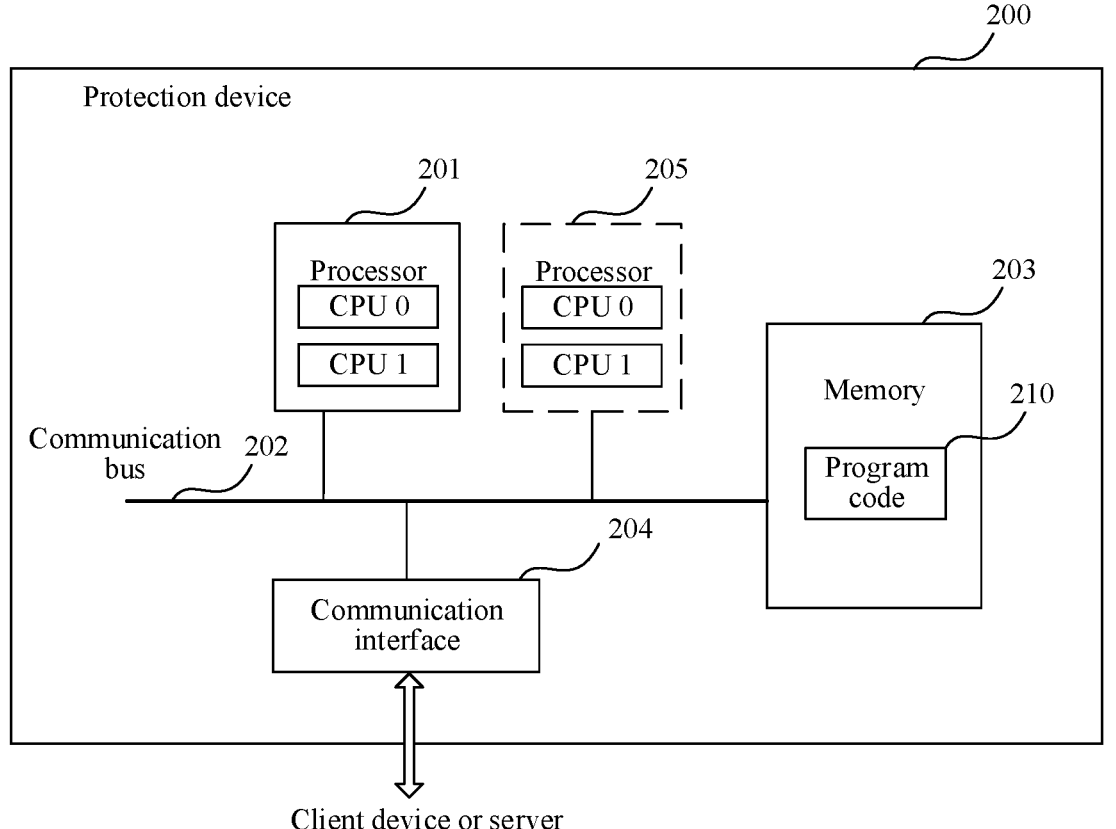
FIG. 4 is a schematic diagram of a structure of a protection device according to an embodiment of this application.

FIG. 4 is a schematic diagram of a structure of a protection device according to an embodiment of this application. Optionally, the protection device having the structure shown in FIG. 4 is the protection device 13 in FIG. 3, FIG. 8, or FIG. 9.

The protection device 200 includes at least one processor 201, a communication bus 202, a memory 203, and at least one communication interface 204.

The processor 201 is, for example, a general-purpose central processing unit (central processing unit, CPU), a network processor (NP), a graphics processing unit (GPU), a neural-network processing unit (NPU), a data processing unit (DPU), a microprocessor, or one or more integrated circuits configured to implement the solutions of this application. For example, the processor 201 includes an application-specific integrated circuit (ASIC), a programmable logic device (PLD), or a combination thereof. The PLD is, for example, a complex programmable logic device (CPLD), a field-programmable gate array (FPGA), generic array logic (GAL), or any combination thereof.

In some embodiments, the processor 201 is configured to support the protection device 200 in performing S520, S530, and S540 in the method 500 shown in FIG. 5. In some embodiments, the processor 201 is further configured to support the protection device 200 in performing S720 and S750 in the method 700 shown in FIG. 7.

The communication bus 202 is configured to transmit information between the foregoing components. The communication bus 202 may be classified into an address bus, a data bus, a control bus, or the like. For ease of representation, only one bold line is used for representation in FIG. 4, but this does not mean that there is only one bus or only one type of bus.

The memory 203 is, for example, a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer, but is not limited thereto. For example, the memory 203 exists independently and is connected to the processor 201 by using the communication bus 202. The memory 203 may alternatively be integrated with the processor 201.

In some embodiments, the memory 203 is configured to support the protection device 200 in buffering a received packet and buffering a sent packet. For example, with reference to FIG. 8 or FIG. 9, the memory 203 includes at least one of a received packet queue 13111, a received packet queue 13121, a sent packet queue 13312, or a sent packet queue 13322.

The communication interface 204 is configured to communicate with another device or a communication network by using any apparatus such as a transceiver. For example, with reference to the deployment scenario shown in FIG. 3, the communication interface 204 is configured to communicate with the client device 11 or the server 12. The communication interface 204 includes a wired communication interface, or may include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, or a combination thereof.

In some embodiments, the communication interface 204 is configured to support the protection device 200 in performing S510 in the method 500 shown in FIG. 5. In some embodiments, the communication interface 204 is further configured to support the protection device 200 in performing S730 and S780 in the method 700 shown in FIG. 7.

During specific implementation, in an embodiment, the processor 201 may include one or more CPUs, for example, a CPU 0 and a CPU 1 shown in FIG. 4.

During specific implementation, in an embodiment, the protection device 200 may include a plurality of processors, for example, the processor 201 and a processor 205 shown in FIG. 4. Each of the processors may be a single-core processor (single-CPU) or a multi-core processor (multi-CPU). The processor herein may be one or more devices, circuits, and/or processing cores configured to process data (for example, computer program instructions).

During specific implementation, in an embodiment, the protection device 200 may further include an output device and an input device. The output device communicates with the processor 201, and may display information in a plurality of manners. For example, the output device may be a liquid crystal display (LCD), a light-emitting diode (LED) display device, a cathode ray tube (CRT) display device, or a projector. The input device communicates with the processor 201, and may receive input from a user in a plurality of manners. For example, the input device may be a mouse, a keyboard, a touchscreen device, or a sensing device.

In some embodiments, the memory 203 is configured to store program code 210 for performing the solutions of this application, and the processor 201 may execute the program code 210 stored in the memory 203. To be specific, the protection device 200 may implement, by using the processor 201 and the program code 210 in the memory 203, the method 500 shown in FIG. 5 or the method 700 shown in FIG. 7.

Figure 7:
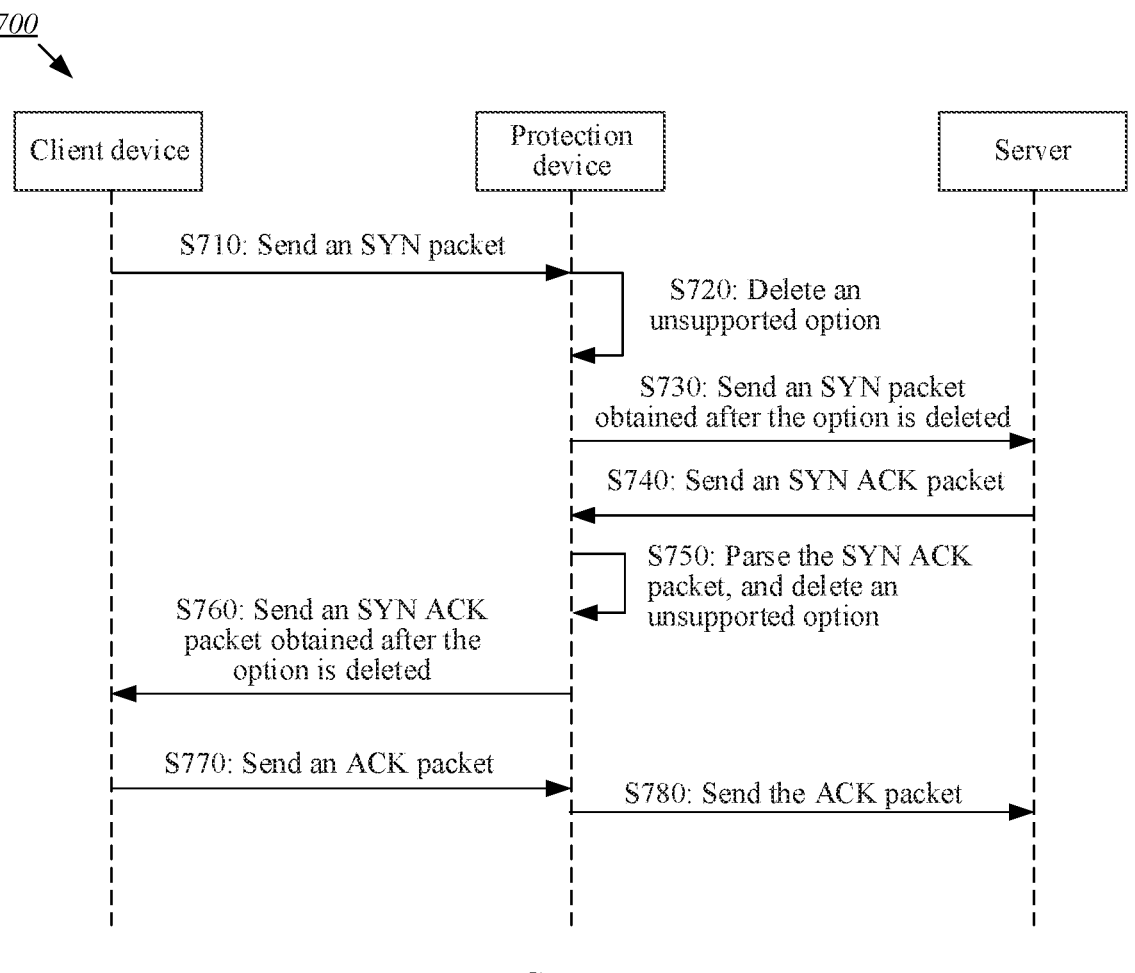
FIG. 7 is a flowchart of processing of a protection device in a three-way handshake phase according to an embodiment of this application.

The protection device 200 in this embodiment of this application may correspond to a protection device in the method 500 shown in FIG. 5 or the method 700 shown in FIG. 7. In addition, the processor 201, the communication interface 204, and the like in the protection device 200 may implement functions and/or various implemented steps and methods of the protection device in the method 500 shown in FIG. 5 or the method 700 shown in FIG. 7. For brevity, details are not described herein again.

With reference to FIG. 5, the following describes a network security protection method provided in an embodiment of this application.

FIG. 5 is a flowchart of a network security protection method 500 according to an embodiment of this application. The method 500 includes step S510 to step S540.

Optionally, a network deployment scenario of a client device, a server, and a protection device in the method 500 is shown in FIG. 3. The client device in the method 500 is the client device 11 in FIG. 3, the server in the method 500 is the server 12 in the system architecture 10, and the protection device in the method 500 is the protection device 13 in FIG. 3.

Optionally, the protection device in the method 500 has a structure shown in FIG. 4.

Step S510: The protection device obtains a first data packet in a first TCP session between the client and the server.

The first session is the $1^{st}$ session established between the client and the server. In some embodiments, the first session is the $1^{st}$ session established between the client and the server within a predetermined time period. A start time point of the predetermined time period is an online time point of a firewall. In some embodiments, the first session is the $1^{st}$ session for accessing a specific service on a specific server through the protection device after the protection device goes online. A first flow is a packet flow in the first session. For example, the first flow is a flow sent by the client to the server in the first session. For another example, the first flow is a flow sent by the server to the client in the first session. In an example scenario, after the firewall is started, a flow for accessing an IP address 10.10.10.10 and a port 80 through the firewall for the first time is the first flow; a flow for accessing an IP address 10.10.10.10 and a port 8080 through the firewall for the first time is the first flow; or a flow for accessing an IP address 20.20.20.20 and a port 80 through the firewall for the first time is the first flow.

In this embodiment, to distinguish between different data packets, "first data packet" and "second data packet" are used to describe different data packets.

The first data packet is a packet received and buffered by the protection device in the first mode. The first data packet includes content exchanged between the client device and the server. In some embodiments, a source device of the first data packet is the client device, and a destination device of the first data packet is the server. For example, the first data packet is a packet generated by the client device based on a data packet from the server, and the first data packet includes response content that the client device needs to feed back to the server. In some other embodiments, a source device of the first data packet is the server, and a destination device of the first data packet is the client device. For example, the first data packet is a packet generated by the server based on a data packet from the client device, and the first data packet includes response content that the server needs to feed back to the client device.

Step S520: The protection device identifies an application layer protocol type of the first data packet based on application layer data of the first data packet.

An application layer protocol is a protocol used by an application on the client device and an application on the server to transmit packets to each other. There are many types of application layer protocols. For example, the application layer protocol is an email transfer protocol. For example, the application layer protocol is SMTP, post office protocol 3 ( ) or internet message access protocol 4 (IMAP4). For another example, the application layer protocol is a file transfer protocol. For example, the application layer protocol is FTP. Certainly, the application layer protocol is optionally another protocol belonging to a TCP/IP protocol suite, and a specific type of the application layer protocol is not limited in this embodiment.

In some embodiments, the protection device identifies the application layer protocol type based on the application layer data and a keyword corresponding to the application layer protocol.

For example, the keyword corresponding to the application layer protocol is a keyword that needs to be included in a data packet according to a specification of the application layer protocol. For example, the keyword corresponding to the application layer protocol is specified by using a standard or draft related to the application layer protocol. In some embodiments, the keyword corresponding to the application layer protocol is a keyword carried in a login command in the application layer protocol. The login command is used to request to log in to the server. With reference to two protocols: SMTP and FTP, the following uses an example to describe the keyword and a manner of identifying the application layer protocol type by using the keyword.

For example, the application layer protocol is SMTP, and a login command in SMTP includes a HELO (hello) command. A keyword corresponding to SMTP is, for example, a keyword carried in the HELO command. The keyword carried in the HELO command is HELO. A format of the HELO command may be briefly represented as "HELO xxxx". "xxxx" in "HELO xxxx" is a parameter included in the HELO command, and the parameter usually means a domain name of an SMTP client. In this case, if the application layer data received by the protection device includes HELO, the protection device may identify that the type of the application layer protocol is SMTP. Certainly, the HELO command is only an example of the login command in SMTP, and HELO is only an example of the keyword corresponding to SMTP. The HELO command may be replaced with another login command in SMTP, for example, an EHLO (extended hello) command. The keyword corresponding to SMTP may be replaced with a keyword in another login command. The keyword used for identifying SMTP is not limited in this embodiment.

For another example, the application layer protocol is FTP, and a login command in FTP includes a USER command. A keyword corresponding to FTP is, for example, a keyword carried in the USER command. Specifically, the keyword carried in the USER command is USER. The USER command may be briefly represented as "USER xxx". "xxxx" in "USER xxx" is a parameter included in the USER command, and the parameter usually means a user name. In this case, if the application layer data received by the protection device includes USER, the protection device may identify that the type of the application layer protocol is FTP. Certainly, the USER command is only an example of the login command in FTP, and USER is only an example of the keyword corresponding to FTP. The USER command may be replaced with another login command in FTP, for example, a pass command or a pays command. The keyword corresponding to FTP may be replaced with a keyword in another login command, for example, pass or pays. The keyword used for identifying FTP is not limited in this embodiment.

Step S530: The protection device determines that a detection mode corresponding to the application layer protocol type is a proxy mode.

In some embodiments, the protection device stores a correspondence between an application layer protocol type and a detection mode. The protection device determines, based on the correspondence between an application layer protocol type and a detection mode, that the detection mode corresponding to the application layer protocol type of the first data packet is the proxy mode.

For example, the correspondence between an application layer protocol type and a detection mode includes a correspondence between SMTP and the proxy mode. After the protection device identifies that the application layer protocol type is SMTP, the protection device determines, based on the correspondence between SMTP and the proxy mode, that the application layer protocol type of the first data packet corresponds to the proxy mode. In this case, the protection device switches to the proxy mode, and performs, in the proxy mode, anti-virus detection on a mail transmitted based on SMTP in the first TCP session.

For another example, the correspondence between an application layer protocol type and a detection mode includes a correspondence between FTP and the flow mode. After the protection device identifies that the application layer protocol type is FTP, the protection device determines, based on the correspondence between FTP and the flow mode, that the application layer protocol type of the first data packet corresponds to the flow mode. In this case, the protection device continues to perform security detection on a subsequent packet in the first TCP session in the flow mode.

Step S540: The protection device performs security detection on a subsequent packet in the first TCP session in the proxy mode.

In the method provided in this embodiment, when the client and the server exchange a packet in the first session, the protection device identifies an application layer protocol type based on application layer data in the packet in the first session. If determining, based on the application layer protocol type, that a detection mode is the proxy mode, the protection device performs security detection on a subsequent packet in the first TCP session in the proxy mode. In this way, the proxy mode can be quickly switched to in a processing process of the first TCP session. This breaks a technical bottleneck that the packet in the first TCP session can be detected in only the flow mode, ensures that the packet in the first TCP session can also be detected in the proxy mode, and avoids missing attack detection caused because the packet in the first TCP session is limited to the flow mode. Therefore, protection effect is improved.

The following describes, by using two examples: example 1 and example 2, how the protection device identifies the protocol type by using the keyword corresponding to the protocol in step S520.

Example 1: The Client Interacts with the Server Based on SMTP

After the first TCP session is established between the client device and the server, the server sends a welcome message to the client device. After the protection device receives the welcome message from the server, the protection device forwards the welcome message to the client device. After receiving the welcome message, the client device sends application layer data including "HELO xxxx". After receiving the application layer data, the protection device finds that the application layer data includes "HELO", and then identifies that SMTP is run in the first TCP session.

For example, the application layer data sent by the client is as follows:

```
220 dshnayder. fscinternet. com ESMTP postfix
HELO localhost
MAIL FROM: <test>
RCPT TO: <test@dshnayder. fscinternet. com>
data
From: "test" <ttest>
To: <test@dshnayder. fscinternet. com>
Subject: open object tag-exploit. html
Content-Type: text/html; charset="iso-8859-1
```

Herein, "220 dshnayder. fscinternet. com ESMTP postfix" is a welcome message, and "HELO localhost" is a HELO command.

Example 2: The Client Interacts with the Server Based on FTP

After the first TCP session is established between the client device and the server, the server sends a welcome message to the client device. After the protection device receives the welcome message from the server, the protection device forwards the welcome message to the client device. After receiving the welcome message, the client device sends application layer data including "USER xxx". After receiving the application layer data, the protection device finds that the application layer data includes "USER", and then identifies that FTP is run in the first TCP session.

For example, the application layer data sent by the client is as follows:

```
220 redhat_52. test FTP server (Version wu-2.4.2-academ[ BETA-18] (1) Mon Aug
3 19: 17: 20 EDT 1998) ready.
USER anonymous
331 Guest login ok, send your complete e-mail address as password.
PASS hi@blahblah. net
230 Guest login ok, access restrictions apply.
MKD /incoming
550 /incoming: Permission denied.
CND /incoming
250 CWD command successful.
```

Herein, "220 redhat_52. test FTP server (Version wu-2.4.2-academ[BETA-18] (1) Mon Aug 3 19: 17: 20 EDT 1998) ready" is a welcome message, and "USER anonymous" is a USER command. The USER command indicates anonymous login to an FTP server.

In the foregoing example 1 and example 2, two application layer protocols: SMTP and FTP, are used as examples for description. An application scope of this embodiment is not limited to these protocols. This embodiment can be applied to various traffic processing scenarios that are based on a protocol type and application layer data and in which whether the proxy mode needs to be used for detection can be determined only after several packets are exchanged.

How the protection device obtains the correspondence between an application layer protocol type and a detection mode has a plurality of implementations. In some embodiments, the protection device determines the correspondence between an application layer protocol type and a detection mode based on a configuration operation of a user. For example, the user configures AV detection for traffic transmitted based on SMTP. Because the proxy mode is usually required for AV detection, the protection device determines that SMTP corresponds to the proxy mode.

In some embodiments, in a process in which the protection device detects traffic in the first session, the user modifies a configuration, so that the correspondence between an application layer protocol type and a detection mode is updated. In this scenario, the protection device determines, based on an updated correspondence between an application layer protocol type and a detection mode, that the detection mode corresponding to the application layer protocol type of the first session is the proxy mode. In this case, the protection device switches to the proxy mode for the first session, thereby implementing real-time validation of user configuration and ensuring that the first flow is detected in the proxy mode in a timely manner. For example, the user modifies a configuration to change from originally using the flow mode to detect traffic to using the proxy mode to detect the traffic. In a process of detecting a packet in the first session, the protection device switches the detection mode for the packet in the first session to the proxy mode after detecting that the configuration is modified.

In some embodiments, after the protection device switches from the flow mode to the proxy mode for the first session, the protection device further switches from the proxy mode back to the flow mode for the first session, to switch the detection mode a plurality of times in the first TCP session. For example, from a perspective of a time sequence, after the first TCP session is established, the protection device first uses the flow mode to detect a data packet in the first TCP session. Then, the protection device performs step S510 to step S530, to switch from the flow mode to the proxy mode, and detect a subsequent data packet in the first TCP session in the proxy mode. Then, in some scenarios, the protection device switches from the proxy mode to the flow mode again, and detect a subsequent data packet in the first TCP session in the flow mode, until the first TCP session ends. The following uses examples to describe some implementations in which the first session uses the flow mode→the proxy mode→the flow mode. For details, refer to the following implementation 1 and implementation 2.

Implementation 1: The protection device determines, based on an AV detection result, to switch from the proxy mode back to the flow mode.

For example, in a process in which the protection device performs security detection on a packet in the first TCP session in the proxy mode, the protection device receives a fourth data packet. The protection device performs AV detection on application layer data of the fourth data packet in the proxy mode, to obtain an AV detection result. If the AV detection result is that there is no virus, the protection device switches to the flow mode, and continues to perform, in the flow mode, security detection on a subsequent packet transmitted after the fourth data packet in the first TCP session. The fourth data packet is a packet transmitted after the first data packet in the first TCP session. For example, in a scenario in which the client interacts with the server based on SMTP in the first session, when the protection device forwards a mail between the client and the server, the protection device performs AV detection on content (including a mail attachment) of the mail in the proxy mode. If an AV detection result of the mail is that the mail does not contain a virus or the mail is secure, the protection device switches from the proxy mode to the flow mode.

Implementation 2: The protection device determines, by identifying that the client and the server are to start encrypted communication, to switch from the proxy mode back to the flow mode.

For example, in a process in which the protection device performs detection on a packet in the first TCP session in the proxy mode, the protection device receives a fifth data packet. The protection device performs security detection on the fifth data packet in the proxy mode. If application layer data of the fifth data packet indicates that the client device and the server are to perform encrypted communication in the TCP session, the protection device switches to the flow mode, and continues to perform, in the flow mode, security detection on a subsequent packet transmitted after the fifth data packet in the first TCP session. The fifth data packet is a packet transmitted after the first data packet in the first TCP session. In some embodiments, the protection device pre-stores a keyword of an encrypted communication command, and if the application layer data of the fifth data packet includes the keyword of the encrypted communication command, determines that the client device and the server are to perform encrypted communication. For example, the encrypted communication command is a starttls command.

In an example application scenario, the protection device performs security detection on an SMTP-based mail by using the foregoing method 500, the server is specifically a mail server, and an SMTP client is installed on the client device. After a session is established between the SMTP client and the mail server, the protection device first detects a data packet in the session in the flow mode. Then, during interaction between the SMTP client and the mail server in the session, if the protection device finds, by using a data packet exchanged between the SMTP client and the mail server, that an application layer protocol corresponding to the session is SMTP, the protection device switches from the flow mode to the proxy mode. The protection device detects a subsequent data packet exchanged between the SMTP client and the mail server in the session in the proxy mode. Specifically, the protection device performs ACK for all mail data sent by the SMTP client, so that the SMTP client completely sends an entire mail (including an attachment) to the protection device. The protection device performs anti-virus detection on the mail data. If the protection device determines that the mail data does not contain a virus, the protection device instead of the SMTP client sends the mail data to the server through a TCP/IP protocol stack of the protection device. If the protection device determines, by performing detection one or more times in the proxy mode, that the mail transmitted between the SMTP client and the server is secure, the protection device switches from the proxy mode to the flow mode, to accelerate a subsequent processing procedure.

In the method provided above, the protection device adaptively switches between different detection modes in a data packet exchange phase in the first session based on a data packet exchange result. This can implement mode selection based on a requirement, avoid a case in which a threat is missed when only the flow mode is used, and avoid a case in which a large quantity of unnecessary resources are occupied when only the proxy mode is used. Therefore, protection effect is improved.

The following describes a processing procedure of the protection device in a three-way handshake phase.

For ease of understanding, the following first describes a three-way handshake principle in TCP.

Figure 6:
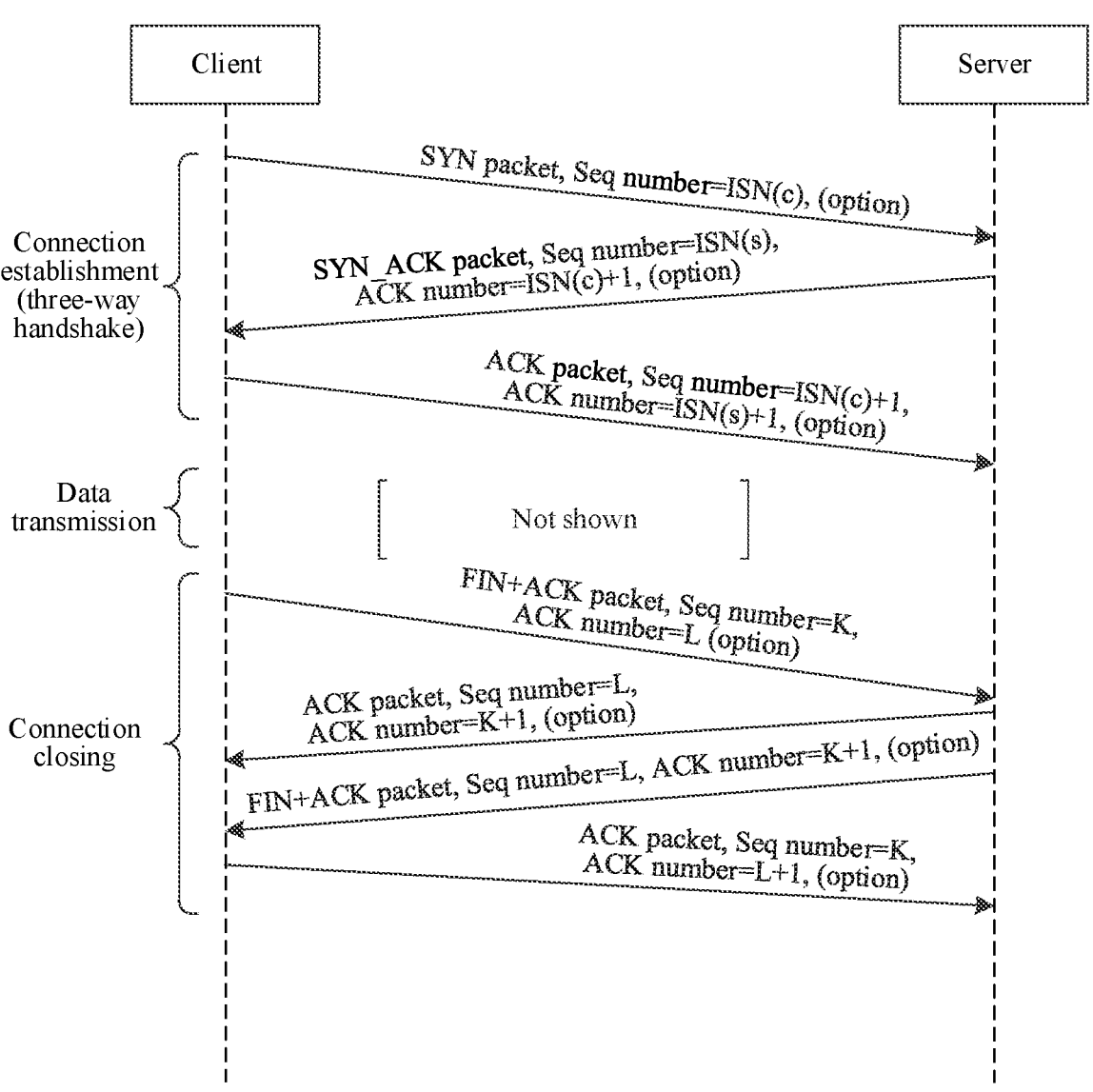
FIG. 6 is a flowchart of three-way handshake between a client and a server according to an embodiment of this application.

FIG. 6 is a flowchart of three-way handshake between a client and a server. In a procedure shown in FIG. 6, the client is an initiator of a TCP session, and the server is a receiver of the TCP session. Interaction between the client and the server mainly includes three phases: session establishment, data transmission, and session closing. FIG. 6 does not show a specific procedure of data transmission.

The session is established through three-way handshake (three-way handshake). When the client and the server need to transmit data by using TCP, the client uses an SYN packet to initiate a TCP session to establish negotiation. This is referred to as three-way handshake. The three-way handshake relates to interaction processes of three packets: an SYN packet, a synchronize sequence number acknowledgement (SYN ACK) packet, and an ACK packet. Specifically, the three-way handshake includes the following step 1 to step 3.

Step 1: The client sends an SYN packet to the server. The SYN packet includes an option required for establishing a TCP session. For example, the option is a maximum segment size (MSS), a SACK, a data buffer size (TCP window), or the like.

An Seq number in the SYN packet is an initial sequence number (initial sequence number, ISN) of the client. The ISN in the SYN packet is a value randomly generated by the client. The ISN in the SYN packet may be briefly represented as ISN(c). "c" in ISN(c) means the client.

Step 2: The server receives the SYN packet, and the server sends an SYN ACK packet to the client. The SYN ACK packet includes an option supported by the server. The server sends the SYN ACK packet, to notify the client that the SYN packet from the client has been received, and notify the client of the supported option.

An Seq number in the SYN ACK packet is an ISN. The ISN in the SYN ACK packet is a value randomly generated by the server. The ISN in the SYN ACK packet may be briefly represented as ISN(s). "s" in ISN(c) means the server. An ACK number in the SYN ACK packet is ISN(c)+1.

Step 3: The client receives the SYN ACK packet, and the client sends an ACK packet to the server, to complete the three-way handshake. An Seq number in the ACK packet is ISN(c)+1. An ACK number in the ACK packet is ISN(s)+1.

After the handshake between the client and the server is completed, when the client and the server exchange data packets in the data transmission phase, the client and the server sequentially send data in segments by using a packet sequence number (Seq) and an MSS that are negotiated through handshake. A maximum value of a volume of data sent by the client or the server each time is a window size advertised by the peer party. A receiver acknowledges a received data packet by using an ACK packet, and updates a maximum data length that can be received by the receiver. In addition, a series of timers and congestion algorithms are further required in TCP to process an abnormal packet loss in a network and a packet loss caused by excessively fast transmission.

The foregoing describes a basic principle of the three-way handshake. Optionally, due to factors such as a version limitation or a performance limitation, in some cases, a protocol stack of the protection device may support only some options but not all options. If the client device and the server perform session negotiation by using an option that is not supported by the protocol stack of the protection device, detection may fail when the protection device performs detection in the proxy mode. In this case, an embodiment of this application provides an improved packet processing manner. The protection device processes an exchanged packet in a three-way handshake phase, to avoid a detection failure caused by the factor that the protocol stack does not support an option. The following describes a processing procedure of the protection device in the three-way hand-shake phase according to an embodiment of this application.

The processing procedure of the protection device in the three-way handshake phase includes the following step S501 to step S503.

A relationship between step S501 to step S503 described below and step S510 to step S540 is that step S501 to step S503 and step S510 to step S540 are respectively for different phases of a same TCP session. Step S501 to step S503 are applied to the three-way handshake phase for triggering TCP session establishment. Step S510 to step S540 are applied to a data transmission phase after TCP session establishment. From a perspective of a time sequence, the protection device first performs step S501 to step S503 in the three-way handshake phase. When a TCP session is established, in a process in which a client device and a server exchange data packets, the protection device performs the foregoing step S510 to step S540.

Step S501: The protection device obtains a first hand-shake packet transmitted between the client device and the server.

The first handshake packet is used to create a TCP session. The first handshake packet is a three-way handshake packet in TCP. Specifically, the first handshake packet is at least one of an SYN packet or an SYN ACK packet. The first handshake packet includes a TCP header, and the TCP header includes an option field with a variable length. Content of the option field is specific information about an option. The option includes but is not limited to a SACK option, an MSS option, a window expansion option, a timestamp option, or the like.

When the first handshake packet is an SYN packet, a source device of the first handshake packet is the client device. Step S501 includes: The protection device receives the SYN packet from the client device.

When the first handshake packet is an SYN ACK packet, a source device of the first handshake packet is the server. Step S501 includes: The protection device receives the SYN ACK packet from the server.

Step S502: The protection device deletes a second option from the first handshake packet, to obtain a second handshake packet.

For example, the first handshake packet includes a first option and the second option. The protection device separately determines whether the first option and the second option are options supported by a TCP/IP protocol stack of the protection device. If the protection device determines that the first option is an option supported by the TCP/IP protocol stack of the protection device, the protection device reserves the first option. If the protection device determines that the second option is an option not supported by the TCP/IP protocol stack of the protection device, the protection device deletes the second option. The second handshake packet obtained by the protection device through processing includes the first option but does not include the second option.

Step S503: The protection device sends the second hand-shake packet to a destination device of the first hand-shake packet.

When the first handshake packet is an SYN packet, the destination device of the first handshake packet is the server. The second handshake packet is an SYN packet obtained after the option is deleted. Step S503 includes: The protection device sends the SYN packet obtained after the option is deleted to the server.

When the first handshake packet is an SYN ACK packet, the destination device of the first handshake packet is the client device. The second handshake packet is an SYN ACK packet obtained after the option is deleted. Step S503 includes: The protection device sends the SYN ACK packet obtained after the option is deleted to the client device.

The foregoing describes, by using step S501 to step S503, a procedure in which the protection device deletes an option in the three-way handshake phase. The following describes a complete procedure of performing three-way handshake based on the foregoing option deletion procedure.

Refer to FIG. 7. In an embodiment of this application, the three-way handshake phase includes a procedure 700 shown in FIG. 7. The procedure 700 includes the following step S710 to step S780. An SYN packet in step S710 and step S720 and an SYN ACK packet in step S740 and step S750 are examples of the first handshake packet. An SYN packet obtained after an option is deleted in step S720 and step S730 and an SYN ACK packet obtained after an option is deleted in step S750 and step S760 are examples of the second handshake packet.

Step S710: A client device generates and sends an SYN packet.

Step S720: A protection device receives the SYN packet from the client. The protection device parses the SYN packet and extracts options such as an MSS, a window, a timestamp, and a SACK of the client from the SYN packet. The protection device deletes, from the SYN packet based on an option supported by a local TCP/IP protocol stack of the protection device, an option not supported by the local TCP/IP protocol stack, and reserves the option supported by the local TCP/IP protocol stack in the SYN packet, to obtain an SYN packet obtained after the option is deleted.

Step S730: The protection device sends the SYN packet obtained after the option is deleted to the server.

Step S740: The server receives the SYN packet obtained after the option is deleted, and generates and sends an SYN ACK packet.

Step S750: The protection device receives the SYN ACK packet from the server. Similar to that in step S720, the protection device parses the SYN ACK packet and extracts options such as an MSS, a window, a time-stamp, and a SACK of the server from the SYN ACK packet. The protection device deletes an unsupported option from the SYN ACK packet based on the option supported by the local TCP/IP protocol stack of the protection device, and reserves the option supported by the local TCP/IP protocol stack in the SYN ACK packet, to obtain an SYN ACK packet obtained after the option is deleted.

Step S760: The protection device sends the SYN ACK packet obtained after the option is deleted to the client.

Step S770: The client receives the SYN ACK packet obtained after the option is deleted, and generates and sends an ACK packet.

Step S780: The protection device receives the ACK packet from the client, and the protection device for-wards the ACK packet from the client to the server, to complete establishment of a session between the client and the server.

The foregoing describes the three-way handshake proce-dure provided in this embodiment, and the following describes a procedure of switching to the proxy mode based on the three-way handshake procedure.

The mode switching procedure described below is an example of step S540 in the foregoing method 500. A main association between the three-way handshake procedure described above and the mode switching procedure described below lies in that, because the protection device deletes the unsupported option in the three-way handshake procedure, it can be ensured that an option related to packet exchange in a process of detecting the first flow in the proxy mode is an option supported by the TCP/IP protocol stack of the protection device, thereby avoiding a packet transmission failure caused because it is difficult for the protection device to parse an option used by the client or the server after the first flow is switched to the proxy mode, and improving reliability and a success rate of detecting the first flow. The following describes a principle for achieving such effect.

In TCP, which options are used to transmit data packets in a TCP session is negotiated by using a three-way handshake packet. For example, in a three-way handshake phase, a transmit end and a receive end (the client and the server) each add an option supported by the transmit end or the receive end to a three-way handshake packet, and send the three-way handshake packet to the peer end, to notify the peer end of options supported by the transmit end or the receive end. After the transmit end or the receive end receives a three-way handshake packet from the peer end, if the three-way handshake packet carries an option, and the transmit end or the receive end supports the option, the transmit end or the receive end uses the option as a negotiated option. After a session is established, the transmit end or the receive end uses the negotiated option to transmit data.

However, in the three-way handshake procedure provided in this embodiment, the protection device deletes an unsupported option from a three-way handshake packet, and forwards a three-way handshake packet obtained after the option is deleted to the client device or the server. Therefore, the three-way handshake packet transmitted to the client device or the server does not include the option not supported by the protection device. In other words, all options in the three-way handshake packet transmitted to the client device or the server are options supported by the protection device. Therefore, each option negotiated by the client device and the server is an option supported by the protection device. This avoids a case in which an option negotiated by the client device and the server includes an option not supported by the protection device. Then, after the first session is established, all options in packets exchanged between the client and the server in the first session are options supported by the protection device.

Therefore, in the procedure of detection for the first session in this embodiment, in a process in which the client and the server exchange a packet in the first session, if the protection device decides to switch a detection mode for the first session, because an option in a packet in the first session received by the protection device after switching to the proxy mode is an option supported by the protection device, the protection device can process, in a mode used after switching, the received packet in the first session by using the option supported by the protection device, to ensure that the protection device successfully enters the proxy mode in the first session process, so that a subsequent packet in the first session can be detected in the proxy mode.

For example, the protection device interferes with handshake between the client device and the server in an initial three-way handshake phase based on a capability of the TCP/IP protocol stack of the protection device, to ensure that all options negotiated by the client device and the server can be supported by the local TCP/IP protocol stack of the protection device. Therefore, once the proxy mode is subsequently switched to in the first session, when the client device and the server exchange packets by using the negotiated option, the TCP/IP protocol stack of the protection device can replace the server to interact with the client device by using the supported option, and the TCP/IP protocol stack of the protection device can replace the client device to interact with the server by using the supported option, so that a task of performing detection in the proxy mode is successfully executed without an error. For example, in a case that the TCP/IP protocol stack on the protection device does not support a SACK option, but the client device and the server support the SACK option, if the client device and the server negotiate to use the SACK option in the three-way handshake phase, it is difficult for the protection device to parse the SACK option after the protection device switches to the proxy mode in the first session. As a result, a packet transmission failure in the first session is caused, and a service is interrupted. However, the protection device deletes the SACK option in a handshake packet, so that the client device and the server do not negotiate to use the SACK option in the three-way handshake phase. Therefore, after the protection device switches to the proxy mode in the first session, a packet that continues to be received does not include the SACK option, thereby avoiding a transmission failure caused because it is difficult for the protection device to parse the SACK option.

Mode switching performed by the protection device between the flow mode and the proxy mode is used as an example below to describe a specific process of the mode switching performed by the protection device in the first session. For details, refer to the following scenario 1 and scenario 2.

Scenario 1: Switching from the Flow Mode to the Proxy Mode

In scenario 1, the protection device may have buffered some data packets in the first session in the flow mode. For example, in the flow mode, the protection device buffers a data packet received in a window, to perform flow reassembly. For another example, the protection device buffers, in the flow mode, some data packets that have been forwarded to a peer end but for which the peer end has not returned an acknowledgement packet. For these previously buffered data packets, the protection device performs the following solution, to further accelerate a mode switching processing process and reduce a mode switching processing delay on the basis of achieving effect brought by option deletion.

The following describes a specific implementation in scenario 1 by using two aspects: aspect (1) and aspect (2).

Aspect (1) describes how the protection device processes a received data packet that is previously buffered in the flow mode.

In a process in which the protection device switches from the flow mode to the proxy mode for the first TCP session, the protection device performs, by using a TCP/IP protocol stack of the protection device, ACK processing on a received data packet that is previously buffered in the flow mode. Specifically, for a data packet sent by the client device that is previously buffered in the flow mode, the protection device actively generates an acknowledgement packet through the TCP/IP protocol stack and sends the acknowledgement packet to the client device, to act as a simulated server to respond to the client device. For a data packet sent by the server that is previously buffered in the flow mode, the protection device actively generates an acknowledgement packet through the TCP/IP protocol stack and sends the acknowledgement packet to the server, to act as a simulated client device to respond to the server.

For example, the protection device reserves a first option (an option supported by the protection device) and deletes a second option (an option not supported by the protection device) in a three-way handshake phase. In the foregoing method 500, the protection device receives and buffers a second data packet in the first TCP session in the flow mode. After the protection device determines to switch to the proxy mode to detect the first TCP session, the protection device generates an acknowledgement packet for the second data packet in the first TCP session based on the first option, and the protection device sends the acknowledgement packet for the second data packet to a source device of the second data packet.

In some embodiments, the second data packet is a packet sent by the client to the server. For example, in a process in which the protection device detects a data packet in the first TCP session in the flow mode, the client sends the second data packet; the protection device receives and buffers the second data packet from the client; and after the protection device determines to switch to the proxy mode to detect the first TCP session, the protection device sends the acknowledgement packet for the second data packet to the client.

In some other embodiments, the second data packet is a packet sent by the server to the client. For example, in a process in which the protection device detects a data packet in the first TCP session in the flow mode, the server sends the second data packet; the protection device receives and buffers the second data packet from the server; and after the protection device determines to switch to the proxy mode to detect the first TCP session, the protection device sends the acknowledgement packet for the second data packet to the server.

Aspect (2) describes how the protection device processes a data packet that has been forwarded to a peer end in the flow mode but for which an acknowledgement packet from the peer end is not received.

In a process in which the protection device switches from the flow mode to the proxy mode for the first TCP session, for a data packet that has been forwarded to a peer end in the flow mode but for which an acknowledgement packet from the peer end is not received, the protection device is responsible for transmission reliability of the data packet by using the TCP/IP protocol stack of the protection device. For example, for a data packet that has been forwarded to the server in the flow mode but for which an acknowledgement packet is not received, the protection device serves as a simulated client, and retransmits the data packet to the server when a packet loss occurs, to ensure that the data packet arrives at the server. For a data packet that has been forwarded to the client in the flow mode but for which an acknowledgement packet is not received, the protection device serves as a simulated server, and retransmits the data packet to the client when a packet loss occurs, to ensure that the data packet arrives at the client.

For example, the protection device reserves the first option (an option supported by the protection device) and deletes the second option (an option not supported by the protection device) in the three-way handshake phase. In the foregoing method 500, the protection device sends a third data packet in the first TCP session in the flow mode, and buffers the third data packet. After the protection device determines to switch to the proxy mode, if the third data packet meets a retransmission condition, the protection device resends the third data packet to a destination device of the third data packet based on the first option.

In some embodiments, the third data packet is a packet sent by the client to the server. For example, in a process in which the protection device detects a data packet in the first TCP session in the flow mode, the client sends the third data packet; the protection device receives the third data packet, performs security detection on the third data packet, and forwards the third data packet to the server; and after the protection device determines to switch to the proxy mode, if the third data packet meets the retransmission condition, the protection device resends the third data packet to the server.

In some embodiments, the third data packet is a packet sent by the server to the client. For example, in a process in which the protection device detects a data packet in the first TCP session in the flow mode, the server sends the third data packet; the protection device receives the third data packet, performs security detection on the third data packet, and forwards the third data packet to the client; and after the protection device determines to switch to the proxy mode, if the third data packet meets the retransmission condition, the protection device resends the third data packet to the client.

It can be learned from the foregoing aspect (1) and aspect (2) that, in a scenario of switching from the flow mode to the proxy mode, the protection device performs, based on an option (the first option) negotiated in the handshake phase, ACK processing on a packet previously buffered in the flow mode and is responsible for reliable transmission, so that the data packet in the first session previously buffered by the protection device in the flow mode can also be processed in the proxy mode quickly, thereby shortening time required for switching from the flow mode to the proxy mode.

Figure 8:
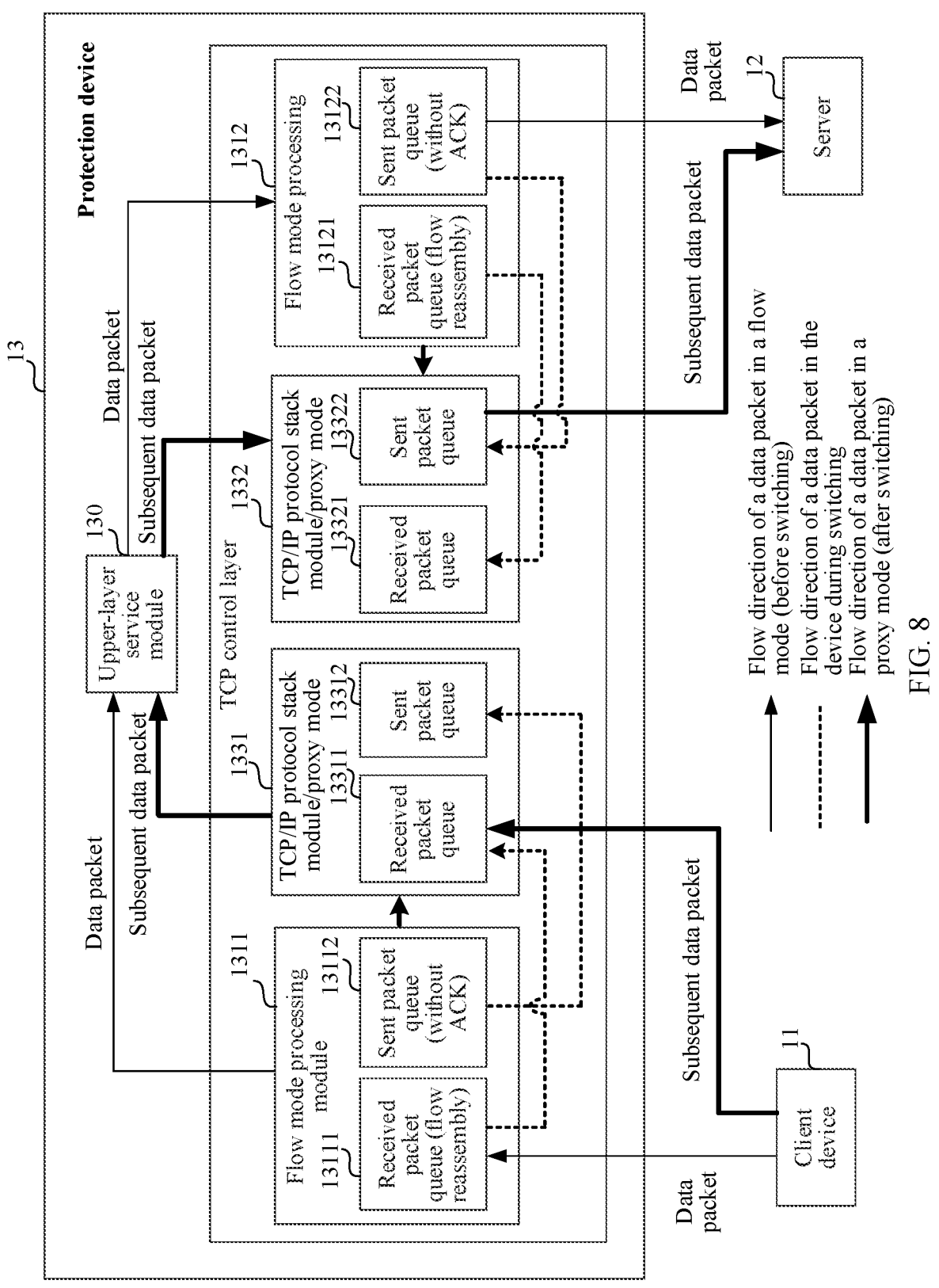
FIG. 8 is a diagram of a system architecture of a protection device according to an embodiment of this application.

Refer to FIG. 8. The protection device supports the foregoing processing procedure by providing functional modules in FIG. 8.

A TCP control layer of the protection device includes a flow mode processing module 1311, a TCP/IP protocol stack module 1331, a flow mode processing module 1312, and a TCP/IP protocol stack module 1332. The flow mode processing module 131 in FIG. 3 includes the flow mode processing module 1311 and the flow mode processing module 1312 in FIG. 8. The TCP/IP protocol stack module 133 in FIG. 3 includes the TCP/IP protocol stack module 1331 and the TCP/IP protocol stack module 1332 in FIG. 8.

The flow mode processing module 1311 is configured to process interaction with the client device 11 in the flow mode. The flow mode processing module 1311 includes a received packet queue 13111 and a sent packet queue 13112. The received packet queue 13111 is configured to buffer a data packet received from the client device 11 in the flow mode. In some embodiments, the received packet queue 13111 is specifically configured to buffer a data packet received from the client device 11 in one window. The data packet buffered in the received packet queue 13111 is used to perform flow reassembly at a TCP layer. The sent packet queue 13112 is configured to buffer a data packet that has been sent to the client device 11 in the flow mode. In some embodiments, the sent packet queue 13112 is specifically configured to buffer a data packet that has been sent but for which an acknowledgement packet from the client device 11 is still not received.

The flow mode processing module 1312 is configured to process interaction with the server 12 in the flow mode. The flow mode processing module 1312 includes a received packet queue 13121 and a sent packet queue 13122. The received packet queue 13121 is configured to buffer a data packet received from the server 12 in the flow mode. In some embodiments, the received packet queue 13121 is specifically configured to buffer a data packet received from the server 12 in one window. The data packet buffered in the received packet queue 13121 is used to perform flow reassembly at a TCP layer. The sent packet queue 13122 is configured to buffer a data packet that has been sent to the server 12 in the flow mode. In some embodiments, the sent packet queue 13122 is specifically configured to buffer a data packet that has been sent but for which an acknowledgement packet from the server 12 is still not received.

The TCP/IP protocol stack module 1331 is a TCP/IP protocol stack module configured to interact with the client device 11.

The TCP/IP protocol stack module 1331 includes a received packet queue 13311 and a sent packet queue 13312. The received packet queue 13311 is configured to buffer a data packet received from the client device 11 in the proxy mode. The sent packet queue 13312 is configured to buffer a data packet that is sent to the client device 11 in the proxy mode. In some embodiments, the sent packet queue 13312 is specifically configured to buffer a data packet that has been sent to the client device 11 in the proxy mode but for which an acknowledgement packet is still not received.

The TCP/IP protocol stack module 1332 is a TCP/IP protocol stack module that interacts with the server 12. The TCP/IP protocol stack module 1332 includes a received packet queue 13321 and a sent packet queue 13322. The received packet queue 13321 is configured to buffer a data packet received from the server 12 in the proxy mode. The sent packet queue 13322 is configured to buffer a data packet that is sent to the server 12 in the proxy mode. In some embodiments, the sent packet queue 13322 is specifically configured to buffer a data packet that has been sent to the server 12 in the proxy mode but for which an acknowledgement packet is still not received.

The following describes how the protection device implements, by using the modules shown in FIG. 3 or FIG. 8, a processing procedure of switching from the flow mode to the proxy mode.

As shown in FIG. 3 and FIG. 8, if the upper-layer service module 130 determines that it is necessary to enter the proxy mode for processing, the upper-layer service module 130 delivers an instruction to the TCP control layer, to notify the TCP control layer that the proxy mode needs to be switched to. After receiving the instruction sent by the upper-layer service module 130, the TCP control layer performs the following step S530*a* to step S530*d*.

Step S530*a*: The TCP control layer quickly establishes a session pair by using the TCP/IP protocol stack module 133 based on TCP three-way handshake negotiation information recorded by the flow mode processing module 131. The session pair includes a proxy server session and a proxy client session. The proxy server session is responsible for interaction with a real client. The proxy client session is responsible for interaction with a real server. The negotiation information includes an option (for example, a first option) negotiated during three-way handshake processing.

Step S530*b*: The TCP control layer sends a data packet buffered in the flow mode processing module 131 to the TCP/IP protocol stack module 133. The TCP/IP protocol stack module 133 performs ACK processing on the packet sent from the flow mode processing module 131, to respond to the real client or the real server.

For example, as shown in FIG. 8, the received packet queue 13111 in the flow mode processing module 1311 buffers a data packet from the client device 11. The TCP control layer sends the data packet buffered in the received packet queue 13111 to the received packet queue 13311 in the TCP/IP protocol stack module 1331. The TCP/IP protocol stack module 1331 performs ACK processing on the packet sent by the flow mode processing module 1311, to respond to the client device 11.

The received packet queue 13121 in the flow mode processing module 1312 buffers a data packet from the server 12. The TCP control layer sends the data packet buffered in the received packet queue 13121 to the received packet queue 13321 in the TCP/IP protocol stack module 1332. The TCP/IP protocol stack module 1332 performs ACK processing on the packet sent by the flow mode processing module 1312, to respond to the server 12.

Step S530*c*: The TCP control layer adds, to a sent packet queue in a TCP/IP protocol stack module/proxy mode processing module, a packet that has been forwarded by the flow mode processing module 131 but for which an ACK is still not received. Specifically, the flow mode processing module 1311 and the TCP/IP protocol stack module 1331 are both responsible for processing interaction with the client device 11, and the flow mode processing module 1312 and the TCP/IP protocol stack module 1332 are both responsible for processing interaction with the server 12. In a process of switching from the flow mode to the proxy mode, the TCP control layer adds a packet buffered in the sent packet queue 13112 in the flow mode processing module 1311 to the sent packet queue 13312 in the TCP/IP protocol stack module 1331. The TCP control layer adds a packet buffered in the sent packet queue 13122 in the flow mode processing module 1312 to the sent packet queue 13322 in the TCP/IP protocol stack module 1332.

For example, the upper-layer service module 130 determines, based on a data packet sent by the client device 11, that the proxy mode needs to be used. After the TCP control layer sends, to the TCP/IP protocol stack module 1331, a data packet subsequently sent by the client device 11, the TCP control layer needs to send, to the TCP/IP protocol stack module 1331, a data packet that has been forwarded by the flow mode processing module 1311 to the client device 11, to implement a function of a proxy client by using the TCP/IP protocol stack module 1331. The TCP/IP protocol stack module 1331 is responsible for a retransmission operation caused by a packet loss or a timeout.

Step S530*d*: The TCP control layer clears a resource used in the flow mode, and enters the proxy mode to process a subsequent packet in a TCP session.

For example, the TCP control layer releases buffer space occupied by the received packet queue 13111 and the sent packet queue 13112 in the flow mode processing module 1311, and the received packet queue 13121 and the sent packet queue 13122 in the flow mode processing module 1312.

In the system architecture provided above, a customized TCP/IP protocol stack is used, so that not only adaptive switching from the flow mode to the proxy mode is implemented based on a data packet exchange result in a data packet exchange phase, but also a complex case in which a data packet has been buffered in the flow mode is supported, thereby improving availability of the solution.

Scenario 2: Switching from the Proxy Mode to the Flow Mode

In a process in which the protection device uses the proxy mode for processing, a TCP/IP protocol stack module of the protection device and an upper-layer service module of the protection device each buffer a specific quantity of data packets. An ideal time point for switching from the proxy mode to the flow mode is that neither of the TCP/IP protocol stack module and the upper-layer service module of the protection device has any buffered data packet. When mode switching is performed at such an ideal time point, the protection device establishes a resource, a status, and the like related to flow mode processing, and releases a resource related to a TCP/IP protocol stack, to complete mode switching. However, generally, this ideal state cannot be met. This is because two types of buffers (a received packet queue and a sent packet queue) in the TCP/IP protocol stack module are usually non-empty. For example, when the protection device determines to switch to the proxy mode, the sent packet queue in the TCP/IP protocol stack module may have buffered some packets that have been sent and for which an acknowledgement from a peer end is waited, and the received packet queue in the TCP/IP protocol stack module may have buffered some packets that have been acknowledged by the TCP/IP protocol stack module and that wait for upper-layer service processing. For these data packets previously buffered in the proxy mode, the protection device performs the following solution, to further ensure transmission reliability of these data packets on the basis of achieving effect brought by option deletion.

The following describes a specific implementation in scenario 2 by using two aspects: aspect (a) and aspect (b). The following implementation can be applied to a scenario in which the protection device switches back to the flow mode after switching from the flow mode to the proxy mode for the first session.

Aspect (a) describes how the protection device processes a sent data packet that is previously buffered in the proxy mode.

In a process in which the protection device switches from the proxy mode to the flow mode for the first TCP session, for data packets in the first TCP session previously sent in the proxy mode, the protection device is responsible for transmission reliability of these data packets by using the TCP/IP protocol stack of the protection device. Specifically, the protection device continues to wait for acknowledgement packets from a peer end for these data packets. After the protection device receives the acknowledgement packets from the peer end for these data packets, the protection device deletes these data packets from a buffer. If the protection device finds, based on a fact that the acknowledgement packets are not received before a timeout, a SACK option, or another manner, that a packet loss occurs in these data packets, the protection device performs retransmission.

For example, the protection device reserves the first option (an option supported by the protection device) and deletes the second option (an option not supported by the protection device) in the three-way handshake phase. In the foregoing method 500, the protection device has sent a sixth data packet in the first TCP session in the proxy mode. After the protection device determines to switch back to the flow mode for the first TCP session, if the sixth data packet meets a retransmission condition, the protection device resends the sixth data packet to a destination device of the sixth data packet based on the first option.

In some embodiments, the sixth data packet is a packet sent by the client to the server in the first TCP session. For example, in a process in which the protection device detects a data packet in the first TCP session in the proxy mode, the client sends the sixth data packet; the protection device receives the sixth data packet, and after parsing the sixth data packet based on the first option, the protection device sends an acknowledgement packet to the client device. In addition, the protection device performs security detection on the sixth data packet. If detection on the sixth data packet succeeds, the protection device sends the sixth data packet to the server. After the protection device determines to switch to the flow mode, if the sixth data packet meets a retransmission condition, the protection device resends the sixth data packet to the server based on the first option.

In some other embodiments, the sixth data packet is a packet sent by the server to the client in the first TCP session. For example, in a process in which the protection device detects a data packet in the first TCP session in the proxy mode, the server sends the sixth data packet; the protection device receives the sixth data packet, and after parsing the sixth data packet based on the first option, the protection device sends an acknowledgement packet to the server. In addition, the protection device performs security detection on the sixth data packet. If detection on the sixth data packet succeeds, the protection device sends the sixth data packet to the client. After the protection device determines to switch to the flow mode, if the sixth data packet meets a retransmission condition, the protection device resends the sixth data packet to the client based on the first option.

Aspect (b) describes how the protection device processes a received data packet that is previously buffered in the proxy mode.

In a process in which the protection device switches from the proxy mode to the flow mode for the first TCP session, for data packets in the first TCP session that have been received and acknowledged in the proxy mode, the protection device first performs security detection on these data packets, and then reliably sends detected data packets by using a TCP/IP protocol stack module of the protection device. Reliable sending means that the TCP/IP protocol stack sends a data packet to a peer end (the client or the server) of the TCP session based on a TCP retransmission mechanism.

For example, the protection device reserves a first option (an option supported by the protection device) and deletes a second option (an option not supported by the protection device) in a three-way handshake phase. In the foregoing method 500, the protection device has received a seventh data packet in the first TCP session in the proxy mode, and the protection device has sent an acknowledgement packet for the seventh data packet to a source device of the seventh data packet after parsing the seventh data packet based on the first option. After the protection device determines to switch to the flow mode, the protection device detects the seventh data packet to obtain an eighth data packet; and the protection device sends the eighth data packet to a destination device of the seventh data packet based on the first option.

In some embodiments, the seventh data packet is a packet sent by the client to the server in the first TCP session. For example, in a process in which the protection device detects a data packet in the first TCP session in the proxy mode, the client sends the seventh data packet; the protection device receives the seventh data packet; and after parsing the seventh data packet based on the first option, the protection device sends the acknowledgement packet for the seventh data packet to the client device. After the protection device determines to switch to the flow mode, the protection device detects the seventh data packet to obtain an eighth data packet; and the protection device sends the eighth data packet to the server based on the first option. In addition, if the eighth data packet meets a retransmission condition, the protection device resends the eighth data packet to the server based on the first option.

In some other embodiments, the seventh data packet is a packet sent by the server to the client in the first TCP session. For example, in a process in which the protection device detects a data packet in the first TCP session in the proxy mode, the server sends the seventh data packet; the protection device receives the seventh data packet; and after parsing the seventh data packet based on the first option, the protection device sends the acknowledgement packet for the seventh data packet to the server. After the protection device determines to switch to the flow mode, the protection device detects the seventh data packet to obtain an eighth data packet; and the protection device sends the eighth data packet to the client based on the first option. In addition, if the eighth data packet meets a retransmission condition, the protection device resends the eighth data packet to the client based on the first option.

With reference to FIG. 9, the following describes how the protection device implements, by using modules shown in FIG. 9, a processing procedure of switching from the proxy mode to the flow mode.

Refer to FIG. 9. Steps in which the protection device switches from the proxy mode to the flow mode include the following step S530*a'* to step S530*i'*.

Step S530*a'*: A TCP control layer stops an operation of pushing a new packet into a protocol stack. Specifically, after the upper-layer service module 130 determines to switch to the flow mode, if the TCP control layer newly receives a data packet from the client device 11, the TCP control layer stops adding the data packet to the received packet queue 13111 in the TCP/IP protocol stack module 1331; and if the TCP control layer newly receives a data packet from the server 12, the TCP control layer stops adding the data packet to the received packet queue 13321 in the TCP/IP protocol stack module 1332.

Step S530*b'*: The TCP control layer discards an out-of-order data packet in the received packet queue 13111 in the TCP/IP protocol stack module 1331 and an out-of-order data packet in the received packet queue 13321 in the TCP/IP protocol stack module 1332.

For example, because a TCP/IP protocol stack module does not return an acknowledgement packet for an out-of-order data packet, the out-of-order data packet can be securely discarded. The out-of-order data packet means that Seq numbers of data packets are inconsecutive. For example, the received packet queue 13111 in the TCP/IP protocol stack module 1331 buffers data packets whose Seq numbers are 1 to 5 and data packets whose Seq numbers are 8 to 10, but the received packet queue 13111 in the TCP/IP protocol stack module 1331 does not contain data packets whose Seq numbers are 6 and 7. In this case, the data packets whose Seq numbers are 8 to 10 are out-of-order data packets. When performing step S530*b*, the TCP control layer discards the data packets whose Seq numbers are 8 to 10.

Step S530*c'*: The TCP control layer submits a data packet in the received packet queue 13111 in the TCP/IP protocol stack module 1331 and a data packet in the received packet queue 13321 in the TCP/IP protocol stack module 1332 to the upper-layer service module 130 for processing, and clears the received packet queue 13111 in the TCP/IP protocol stack module 1331 and the received packet queue 13321 in the TCP/IP protocol stack module 1332.

Step S530*d'*: The upper-layer service module 130 sends a processed data packet to the TCP control layer, and then the upper-layer service module 130 clears a buffer. The TCP control layer sends the processed data packet to a sent packet queue in a TCP/IP protocol stack module at a peer end.

For example, if the data packet is from the received packet queue 13111 in the TCP/IP protocol stack module 1331, the TCP control layer sends the data packet to the sent packet queue 13322 in the TCP/IP protocol stack module 1332, and the sent packet queue 13322 in the TCP/IP protocol stack module 1332 sends the data packet to the server 12. If the data packet is from the received packet queue 13321 in the TCP/IP protocol stack module 1332, the TCP control layer sends the data packet to the sent packet queue 13312 in the TCP/IP protocol stack module 1331, and the sent packet queue 13312 in the TCP/IP protocol stack module 1331 sends the data packet to the client.

Step S530*e'*: For a data packet in a sent packet queue, the protection device reliably sends the data packet by using a TCP/IP protocol stack module, and records a largest Seq number of a data packet that has been sent by the TCP/IP protocol stack module. The largest Seq number of the sent data packet is, for example, a value obtained by increasing an initial sequence number (ISN) based on a length of sent data. For example, if an initial sequence number of the client, that is, ISN(c), is 1000, and the protection device has forwarded 2000-byte data for the client, a largest Seq number is 3001, where an SYN packet occupies 1 byte.

Step S530*f*: After receiving a subsequent data packet from the client or the server, the protection device processes the subsequent data packet in the flow mode.

When the protection device receives an acknowledgement packet from the client or the server, a step of processing the acknowledgement packet includes the following step S530*g'* or step S530*h'*. For example, if the protection device does not support a SACK option, the protection device deletes the SACK option from a handshake packet in a three-way handshake phase, and processes the acknowledgement packet according to the following step S530*g*. If the protection device supports the SACK option, the protection device reserves the SACK option in a handshake packet in a three-way handshake phase, and processes the acknowledgement packet according to the following step S530*h'*.

Step S530*g'*: If the protection device does not support the SACK option, for the acknowledgement packet, the protection device determines an ACK number of the acknowledgement packet. If the ACK number of the acknowledgement packet is smaller than or equal to the recorded largest Seq number, the protection device sends the acknowledgement packet to the TCP/IP protocol stack module. If the ACK number of the acknowledgement packet is greater than the recorded largest Seq number, the protection device jumps to step S530*i*, and processes the acknowledgement packet in the flow mode.

Sending the acknowledgement packet to the TCP/IP protocol stack module and processing the acknowledgement packet in the flow mode are two different actions.

If the protection device processes the acknowledgement packet in the flow mode, the protection device forwards the acknowledgement packet to a peer end. For example, if the acknowledgement packet is from the server, the protection device forwards the acknowledgement packet to the client. If the acknowledgement packet is from the client, the protection device forwards the acknowledgement packet to the server.

If the protection device sends the acknowledgement packet to the TCP/IP protocol stack module, the protection device does not forward the acknowledgement packet to a peer end. Instead, the TCP/IP protocol stack module processes the acknowledgement packet. For example, if the acknowledgement packet is from the server, the protection device does not forward the acknowledgement packet to the client. Instead, the TCP/IP protocol stack module acts as a simulated server to process the acknowledgement packet.

Step S530h': If the protection device supports the SACK option, the protection device performs processing according to TCP based on a range in the SACK option and the recorded largest Seq number. If the acknowledgement packet is an acknowledgement packet for a data packet sent by a TCP/IP protocol stack, the protection device sends the acknowledgement packet to the TCP/IP protocol stack for processing. If the acknowledgement packet is an acknowledgement packet for a data packet forwarded in the flow mode, the protection device processes the acknowledgement packet in the flow mode to send the acknowledgement packet to a peer device for processing. Further, if the SACK option acknowledges both data sent by the TCP/IP protocol stack and data forwarded in the flow mode, the protection device splits the acknowledgement packet for processing by the TCP/IP protocol stack and processing in the flow mode.

For example, a source end sequentially sends seven packets, which are respectively a packet 1, a packet 2, a packet 3, a packet 4, a packet 5, a packet 6, and a packet 7. The packet 4 is lost, and the packet 1, the packet 2, the packet 3, the packet 5, the packet 6, and the packet 7 are successfully transmitted to a destination end. If the source end and destination end negotiate to use a SACK option during three-way handshake, the destination end can use the SACK option to indicate that the packet 4 is lost. Specifically, an acknowledgement packet returned by the destination end includes an ACK number and the SACK option. The ACK number is used to indicate that the packet 1, the packet 2, and the packet 3 have been received, and a sequence number in the SACK option is used to indicate that the packet 5, the packet 6, and the packet 7 have been received. Therefore, the sender can know, based on the ACK number and the sequence number in the SACK option, that the packet 4 is lost. With reference to a scenario in which the protection device switches from the proxy mode to the flow mode, for example, the protection device receives a packet 1, a packet 2, a packet 3, a packet 4, and a packet 5 in the proxy mode, and the protection device sends the packet 1, the packet 2, the packet 3, the packet 4, and the packet 5 by using a TCP/IP protocol stack of the protection device. After determining to switch to the flow mode, the protection device subsequently receives a packet 6 and a packet 7. The protection device forwards the packet 6 and the packet 7 in the flow mode. If the protection device, the client, and the server all use a SACK option, the protection device splits an acknowledgement packet when receiving the acknowledgement packet. The protection device processes content corresponding to the packet 1, the packet 2, the packet 3, the packet 4, and the packet 5 in the acknowledgement packet by using the TCP/IP protocol stack of the protection device. For example, if the packet 4 is lost, the protection device retransmits the packet 4 by using the TCP/IP protocol stack of the protection device. For content corresponding to the packet 6 and the packet 7 in the acknowledgement packet, the protection device notifies, in the flow mode, the source end to process the content.

Step S530i': If all data packets buffered in a sent packet queue for a current TCP session in the TCP/IP protocol stack module are sent, and the protection device has received acknowledgement packets for these data packets, the protection device deletes a related resource of the TCP/IP protocol stack module. The protection device processes all subsequent packets in the TCP session in the flow mode.

In the system architecture provided above, a customized TCP/IP protocol stack is used, so that not only adaptive switching from the proxy mode to the flow mode is implemented based on a data packet exchange result in a data packet exchange phase, but also a complex case in which a data packet has been buffered in the proxy mode is supported, thereby improving availability of the solution.

FIG. 10 is a schematic diagram of a possible structure of a protection device.

For example, the protection device 800 shown in FIG. 10 implements a function of the protection device in the method 500 shown in FIG. 5. In some embodiments, the protection device 800 shown in FIG. 10 is further configured to implement a function of the protection device in the method 700 shown in FIG. 7.

In some embodiments, the protection device 800 shown in FIG. 10 is the protection device 13 in FIG. 3, FIG. 8, or FIG. 9. For example, a processing unit 802 in the protection device 800 shown in FIG. 10 is implemented by using at least one of the flow mode processing module 1311, the TCP/IP protocol stack module 1331, the flow mode processing module 1312, and the TCP/IP protocol stack module 1332 in FIG. 8 or FIG. 9.

As shown in FIG. 10, the protection device 800 includes an obtaining unit 801 and the processing unit 802. Optionally, the protection device 800 further includes a sending unit and a storage unit. All or some of the units in the protection device 800 are implemented by using software, hardware, firmware, or any combination thereof. The units in the protection device 800 are separately configured to perform corresponding functions of the protection device in the method 500 or the method 700. Specifically, the obtaining unit 801 is configured to support the protection device 800 in performing S510. The processing unit 802 is configured to support the protection device 800 in performing S520, S530, and S540. In some embodiments, the processing unit 802 is further configured to support the protection device 800 in performing S720 and S750. The sending unit is configured to support the protection device 800 in performing S730 and S780. The storage unit is configured to support the protection device 800 in buffering a data packet.

In this embodiment of this application, division into the units is an example, and is merely logical function division. During actual implementation, another division manner may be optionally used.

In some embodiments, the units in the protection device 800 are integrated into one unit. For example, the units in the protection device 800 are integrated on a same chip. The chip includes a processing circuit, and an input interface and an output interface that are internally connected to and communicate with the processing circuit. The processing unit 802 is implemented by using the processing circuit in the chip. The obtaining unit 801 is implemented by using the input interface in the chip. The sending unit is implemented by using the output interface in the chip. For example, the chip is implemented by using one or more field-programmable gate arrays (FPGAs), a programmable logic device (PLD), a controller, a state machine, gate logic, a discrete hardware component, any other suitable circuit, or any combination of circuits that can perform various functions described in this application.

In some other embodiments, each unit of the protection device 800 exists alone physically. In some other embodiments, some units of the protection device 800 exist alone physically, and the other units are integrated into one unit. For example, in some embodiments, the obtaining unit 801 and the sending unit in the protection device 800 are integrated into same hardware (such as a communication interface). In some embodiments, integration of different units is implemented in a form of hardware, that is, different units correspond to same hardware. For another example, integration of different units is implemented in a form of a software unit.

When the protection device 800 is implemented by using hardware, the processing unit 802 in the protection device 800 is implemented, for example, by using the processor 201 in the protection device 200 shown in FIG. 4. The obtaining unit 801 and the sending unit in the protection device 800 are implemented, for example, by using the communication interface 204 in the protection device 200 shown in FIG. 4. The storage unit in the protection device 800 is implemented, for example, by using the memory 203 in the protection device 200 shown in FIG. 4.

When the protection device 800 is implemented by using software, each unit in the protection device 800 is, for example, software generated after the processor 201 in the protection device 200 reads the program code 210 stored in the memory 203. For example, the protection device 800 is a virtualized device. The virtualized device includes but is not limited to at least one of a virtual machine, a container, and a pod. In some embodiments, the protection device 800 is deployed on a hardware device (for example, a physical server) in a form of a virtual machine. For example, the protection device 800 is implemented based on a general-purpose physical server in combination with a network function virtualization (NFV) technology. When a virtual machine is used for implementation, the protection device 800 is, for example, a virtual host, a virtual router, or a virtual switch. By reading this application, a person skilled in the art may obtain the protection device 800 on the general-purpose physical server through virtualization with reference to the NFV technology. In some other embodiments, the protection device 800 is deployed on a hardware device in a form of a container (for example, a docker container). For example, a procedure in which the protection device 800 performs the foregoing method embodiment is packaged in an image file, and the hardware device creates the protection device 800 by running the image file. In some other embodiments, the protection device 800 is deployed on a hardware device in a form of a pod. The pod includes a plurality of containers, and each container is configured to implement one or more units in the protection device 800.

A person of ordinary skill in the art may be aware that, in combination with the examples described in embodiments disclosed in this specification, method steps and units can be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiment. Details are not described herein again.

In this application, terms such as "first" and "second" are used to distinguish same items or similar items that have basically same functions. It should be understood that there is no logical or time sequence dependency between "first" and "second", and a quantity and an execution sequence are not limited. For example, without departing from the scope of various examples, a first data packet may be referred to as a second data packet, and similarly, a second data packet may be referred to as a first data packet. Both the first data packet and the second data packet may be data packets, and may be separate and different data packets in some cases.

The term "at least one" in this application means one or more.

All or some of the foregoing embodiments may be implemented by software, hardware, firmware, or any combination thereof. When software is used to implement the embodiments, the embodiments may be implemented completely or partially in a form of a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer program instructions may be transmitted from a web site, computer, server, or data center to another web site, computer, server, or data center in a wired or wireless manner. The computer-readable storage medium may be any usable medium accessible by a computer, or a data storage device such as a server or a data center that integrates one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A network security protection method, wherein the method comprises:

obtaining, by a protection device, a first data packet in a first transmission control protocol (TCP) session between a client device and a server, wherein the first TCP session is an initial session established between the client device and the server, and the protection device is deployed between the client device and the server;

identifying, by the protection device, an application layer protocol type of the first data packet based on application layer data of the first data packet;

determining, by the protection device, based on a correspondence between application layer protocol types and detection modes supported by the protection device, that a detection mode corresponding to the application layer protocol type of the first data packet is a proxy mode, wherein the detection modes include the proxy mode and a flow mode; and performing, by the protection device, security detection on a subsequent packet in the first TCP session in the proxy mode.

2. The method according to claim 1, wherein before the obtaining, by a protection device, a first data packet in a first transmission control protocol TCP session between a client device and a server, the method further comprises:

obtaining, by the protection device, a first handshake packet transmitted between the client device and the server, wherein the first handshake packet is used to create the first TCP session, the first handshake packet comprises a first option and a second option, the first option is an option supported by the protection device, and the second option is an option not supported by the protection device;

deleting, by the protection device, the second option from the first handshake packet, to obtain a second handshake packet; and sending, by the protection device, the second handshake packet to a destination device of the first handshake packet.

3. The method according to claim 2, wherein the subsequent packet in the first TCP session comprises a second data packet, and the performing, by the protection device, security detection on a subsequent packet in the first TCP session in the proxy mode comprises:

receiving and buffering, by the protection device, the second data packet;

generating, by the protection device, an acknowledgment packet for the second data packet based on the first option; and sending, by the protection device, the acknowledgement packet for the second data packet to a source device of the second data packet, wherein the source device of the second data packet is the client device or the server.

4. The method according to claim 2, wherein the subsequent packet in the first TCP session comprises a third data packet, and the performing, by the protection device, security detection on a subsequent packet in the first TCP session in the proxy mode comprises:

sending and buffering, by the protection device, the third data packet; and based on the third data packet satisfying a retransmission condition, resending, by the protection device, the third data packet to a destination device of the third data packet based on the first option, wherein the destination device of the third data packet is the client device or the server.

5. The method according to claim 4, wherein the retransmission condition comprises: the protection device does not receive an acknowledgement packet for a data packet; or the first option is a selective acknowledgement (SACK) option, and the retransmission condition comprises: the protection device determines, based on information in a SACK option from a destination device of a data packet, that a packet loss occurs in the data packet.

6. The method according to claim 2, wherein the first handshake packet is a synchronize sequence number (SYN) packet from the client device, and the destination device of the first handshake packet is the server; or the first handshake packet is a synchronize sequence number acknowledgement (SYN ACK) packet from the server, and the destination device of the first handshake packet is the client device.

7. The method according to claim 1, wherein the security detection is anti-virus (AV) detection, and the performing, by the protection device, security detection on a subsequent packet in the first TCP session in the proxy mode comprises:

performing, by the protection device, AV detection on a fourth data packet in the first TCP session in the proxy mode, wherein the fourth data packet is a packet transmitted after the first data packet in the first TCP session; and the method further comprises:

based on a result of the AV detection performed by the protection device on the fourth data packet in the first TCP session being that there is no virus, switching, by the protection device, to the flow mode, and continuing to perform, in the flow mode, security detection on a subsequent packet transmitted after the fourth data packet in the first TCP session.

8. The method according to claim 1, wherein the performing, by the protection device, security detection on a subsequent packet in the first TCP session in the proxy mode comprises:

detecting, by the protection device, a fifth data packet in the first TCP session in the proxy mode, wherein the fifth data packet is a packet transmitted after the first data packet in the first TCP session; and the method further comprises:

based on application layer data of the fifth data packet indicating that the client device and the server are to perform encrypted communication in the TCP session, switching, by the protection device, to the flow mode, and continuing to perform, in the flow mode, security detection on a subsequent packet transmitted after the fifth data packet in the first TCP session.

9. A protection device, wherein the protection device comprises:

an obtaining unit, configured to obtain a first data packet in a first transmission control protocol (TCP) session between a client device and a server, wherein the first TCP session is an initial session established between the client device and the server, and the protection device is deployed between the client device and the server; and a processor, configured to identify an application layer protocol type of the first data packet based on application layer data of the first data packet, wherein the processor is further configured to determine, based on a correspondence between application layer protocol types and detection modes supported by the protection device, that a detection mode corresponding to the application layer protocol type of the first data packet is a proxy mode, wherein the detection modes include the proxy mode and a flow mode; and the processor is further configured to perform security detection on a subsequent packet in the first TCP session in the proxy mode.

10. The protection device according to claim 9, wherein the obtaining unit is further configured to obtain a first handshake packet transmitted between the client device and the server, wherein the first handshake packet is used to create the first TCP session, the first handshake packet comprises a first option and a second option, the first option is an option supported by the protection device, and the second option is an option not supported by the protection device;

the processor is further configured to delete the second option from the first handshake packet, to obtain a second handshake packet; and the protection device further comprises a sending unit, and the sending unit is configured to send the second handshake packet to a destination device of the first handshake packet.

11. The protection device according to claim 10, wherein the subsequent packet in the first TCP session comprises a second data packet;

the protection device further comprises a receiving unit and a storage unit, the receiving unit is configured to receive the second data packet, and the storage unit is configured to buffer the second data packet;

the processor is configured to generate an acknowledgment packet for the second data packet based on the first option; and the sending unit is configured to send the acknowledgement packet for the second data packet to a source device of the second data packet, wherein the source device of the second data packet is the client device or the server.

12. The protection device according to claim 10, wherein the subsequent packet in the first TCP session comprises a third data packet, and the sending unit is configured to send the third data packet;

the protection device further comprises a storage unit, and the storage unit is configured to buffer the third data packet; and the sending unit is further configured to: based on the third data packet satisfying a retransmission condition, resend the third data packet to a destination device of the third data packet based on the first option, wherein the destination device of the third data packet is the client device or the server.

13. The protection device according to claim 9, wherein the security detection is anti-virus (AV) detection, and the processor is configured to perform AV detection on a fourth data packet in the first TCP session in the proxy mode, wherein the fourth data packet is a packet transmitted after the first data packet in the first TCP session; and the processor is further configured to: based on a result of the AV detection performed on the fourth data packet in the first TCP session being that there is no virus, switch to the flow mode, and continue to perform, in the flow mode, security detection on a subsequent packet transmitted after the fourth data packet in the first TCP session.

14. The protection device according to claim 9, wherein the processor is configured to detect a fifth data packet in the first TCP session in the proxy mode, wherein the fifth data packet is a packet transmitted after the first data packet in the first TCP session; and the processor is further configured to: based on application layer data of the fifth data packet indicating that the client device and the server are to perform encrypted communication in the TCP session, switch to the flow mode, and continue to perform, in the flow mode, security detection on a subsequent packet transmitted after the fifth data packet in the first TCP session.

15. A protection device, wherein the protection device comprises a processor and a communication interface, the processor is configured to execute program code to enable the protection device to perform the method according to claim 1, and the communication interface is configured to receive or send a packet.

16. A computer program product, wherein the computer program product comprises one or more computer program instructions, and when the computer program instructions are loaded and executed by a computer, the computer is enabled to perform the network security protection method according to claim 1.

* * * * *